(12) United States Patent
Cotrim et al.

(10) Patent No.: US 10,696,604 B2
(45) Date of Patent: Jun. 30, 2020

(54) GRANULAR FERTILIZERS COMPRISING MACRONUTRIENTS AND MICRONUTRIENTS, AND PROCESSES FOR MANUFACTURE THEREOF

(71) Applicant: Produquímica Indústria e Comércio S.A., São Paulo (BR)

(72) Inventors: André Cotrim, Suzano (BR); Ricardo Oliveira, Suzano (BR); Michel Castellani, Suzano (BR); Ithamar Prada, Sãp Paulo (BR)

(73) Assignee: Produquímica Indústria e Comércio S.A., São Paulo (BR)

( * ) Notice: Subject to any disclaimer, the term of this patent is extended or adjusted under 35 U.S.C. 154(b) by 195 days.

(21) Appl. No.: 15/903,998

(22) Filed: Feb. 23, 2018

(65) Prior Publication Data

US 2018/0237351 A1    Aug. 23, 2018

Related U.S. Application Data

(60) Provisional application No. 62/462,735, filed on Feb. 23, 2017.

(51) Int. Cl.
| | | |
|---|---|---|
| *C05D 9/00* | (2006.01) | |
| *C05G 5/12* | (2020.01) | |
| *C05B 17/02* | (2006.01) | |
| *C05D 1/00* | (2006.01) | |
| *C05D 5/00* | (2006.01) | |

(Continued)

(52) U.S. Cl.
CPC ............ *C05G 5/12* (2020.02); *C05B 1/02* (2013.01); *C05B 1/04* (2013.01); *C05B 7/00* (2013.01); *C05B 17/02* (2013.01); *C05B 19/00* (2013.01); *C05C 7/00* (2013.01); *C05D 1/00* (2013.01);

(Continued)

(58) Field of Classification Search
None
See application file for complete search history.

(56) References Cited

U.S. PATENT DOCUMENTS

| 2,107,701 A | 2/1938 | Haase et al. |
| 2,107,702 A | 2/1938 | Haase et al. |

(Continued)

FOREIGN PATENT DOCUMENTS

| BR | PI0601647 | 9/2006 |
| CN | 1440957 | 9/2003 |

(Continued)

OTHER PUBLICATIONS

Office Action dated Jun. 10, 2019 in co-pending U.S. Appl. No. 15/611,655, filed Jun. 1, 2017, 24 pages.

(Continued)

*Primary Examiner* — Wayne A Langel
(74) *Attorney, Agent, or Firm* — Hovey Williams LLP

(57) ABSTRACT

Novel granular fertilizers and methods of making those fertilizers are provided. The method utilized involves recycling streams, including one that provides water having dissolved solids therein, with that water being used during the mixing and granulation process. This method results in a low-moisture, hard, substantially spherical granule, which can include any number of macronutrients and/or micronutrients. Advantageously, the granular fertilizer can be applied to the soil around plants to supply those plants with the necessary nutrients.

17 Claims, 6 Drawing Sheets

(51) Int. Cl.
| | |
|---|---|
| *C05C 7/00* | (2006.01) |
| *C05G 5/30* | (2020.01) |
| *C05B 1/02* | (2006.01) |
| *C05B 1/04* | (2006.01) |
| *C05B 7/00* | (2006.01) |
| *C05B 19/00* | (2006.01) |

(52) U.S. Cl.
CPC ............... *C05D 5/00* (2013.01); *C05D 9/00* (2013.01); *C05G 5/30* (2020.02); *C05G 5/37* (2020.02)

(56) References Cited

U.S. PATENT DOCUMENTS

| | | | |
|---|---|---|---|
| 3,576,614 A * | 4/1971 | Fukuba | C05B 1/02 71/29 |
| 3,620,709 A | 11/1971 | Petkovsek et al. | |
| 3,660,068 A * | 5/1972 | Wilson | C05B 7/00 71/34 |
| 3,711,254 A | 1/1973 | McGowan et al. | |
| 3,776,713 A * | 12/1973 | Quanquin | C05B 7/00 71/33 |
| 4,601,891 A * | 7/1986 | McGill | C05B 13/06 423/305 |
| 5,460,765 A | 10/1995 | Derdall et al. | |
| 5,466,274 A * | 11/1995 | Hudson | C05G 3/0023 71/28 |
| 5,942,021 A | 8/1999 | Stirrup | |
| 6,132,484 A | 10/2000 | Phinney | |
| 6,254,655 B1 | 7/2001 | Goertz | |
| 6,273,928 B1 | 8/2001 | Hayati et al. | |
| 6,294,633 B1 | 9/2001 | Hidaka et al. | |
| 6,309,439 B1 | 10/2001 | von Locquenghien et al. | |
| 6,387,145 B1 | 5/2002 | Miele et al. | |
| 6,464,746 B2 | 10/2002 | Neyman et al. | |
| 6,749,659 B1 | 6/2004 | Yu et al. | |
| 6,890,888 B2 | 5/2005 | Pursell et al. | |
| 7,445,657 B2 | 11/2008 | Green | |
| 8,017,158 B2 | 9/2011 | Valencia et al. | |
| 8,241,387 B2 | 8/2012 | Shah | |
| 8,668,759 B2 | 3/2014 | Antens et al. | |
| 8,679,219 B2 | 3/2014 | Garcia Martinez et al. | |
| 8,801,827 B2 | 8/2014 | Taylor et al. | |
| 8,814,976 B2 | 8/2014 | Pedersen | |
| 8,979,970 B2 | 3/2015 | Kucera et al. | |
| 8,999,031 B2 | 4/2015 | Varadachari | |
| 9,079,805 B2 | 7/2015 | Muller | |
| 9,174,885 B2 | 11/2015 | Taulbee | |
| 9,366,485 B2 | 6/2016 | Schromm et al. | |
| 9,409,827 B2 | 8/2016 | Taylor et al. | |
| 9,540,291 B2 | 1/2017 | Wheeler et al. | |
| 2002/0165097 A1 | 11/2002 | Sanders et al. | |
| 2004/0050126 A1 | 3/2004 | Green | |
| 2004/0050127 A1* | 3/2004 | Ambri | C05D 9/00 71/31 |
| 2005/0144997 A1 | 7/2005 | Phillips et al. | |
| 2007/0227212 A1 | 10/2007 | He et al. | |
| 2009/0145191 A1* | 6/2009 | Elizer | C05D 3/04 71/62 |
| 2010/0234223 A1* | 9/2010 | Pursell | A01N 25/12 504/101 |
| 2010/0326151 A1 | 12/2010 | Madigan et al. | |
| 2011/0214465 A1 | 9/2011 | Peacock et al. | |
| 2011/0230353 A1* | 9/2011 | Anderson | A01N 25/12 504/320 |
| 2011/0286799 A1 | 11/2011 | de la Garza et al. | |
| 2012/0131971 A1* | 5/2012 | Heaton | C05D 9/00 71/29 |
| 2013/0210624 A1 | 8/2013 | Stringfellow et al. | |
| 2014/0137616 A1 | 5/2014 | Peacock et al. | |
| 2014/0216120 A1 | 8/2014 | Taylor et al. | |
| 2014/0235438 A1* | 8/2014 | Thompson | A01N 25/12 504/100 |
| 2014/0245803 A1* | 9/2014 | Forsythe | C05G 3/0058 71/61 |
| 2014/0260467 A1 | 9/2014 | Peacock et al. | |
| 2015/0135786 A1* | 5/2015 | Weaver | C05G 3/00 71/50 |
| 2015/0251962 A1 | 9/2015 | Peacock et al. | |
| 2016/0075607 A1 | 3/2016 | Aqel et al. | |
| 2016/0102028 A1 | 4/2016 | Lee et al. | |
| 2016/0130191 A1* | 5/2016 | Clark | C05B 1/02 71/36 |
| 2016/0200637 A1* | 7/2016 | Jacobson | B05B 15/00 71/7 |
| 2016/0207844 A1 | 7/2016 | Stoller et al. | |
| 2016/0229761 A1 | 8/2016 | Cherry et al. | |
| 2016/0244378 A1 | 8/2016 | Tyler et al. | |
| 2017/0253534 A1 | 9/2017 | Pursell et al. | |
| 2018/0179117 A1* | 6/2018 | Socolovsky | C05D 1/00 |
| 2019/0233345 A1* | 8/2019 | Avgousti | C05G 3/0029 |

FOREIGN PATENT DOCUMENTS

| | | |
|---|---|---|
| CN | 103588561 | 2/2014 |
| CN | 105884424 | 8/2016 |
| CN | 106007899 | 10/2016 |
| EP | 0 571 532 | 5/1997 |
| JP | H09188587 | 7/1997 |
| JP | 2013-177287 | 9/2013 |
| KR | 10-2013-0059716 | 6/2013 |
| KR | 10-2015-0071090 | 6/2015 |
| RU | 2416593 | 4/2011 |
| WO | 92/14690 | 9/1992 |
| WO | 2015/010202 | 1/2015 |
| WO | 2015/179687 | 11/2015 |

OTHER PUBLICATIONS

Machine Translation of CN106007899, 18 pages.
Machine Translation of CN1440957, 5 pages.
English abstract only of CN103588561, 1 page.
English abstract only of KR10-2013-0059716, 1 page.
English abstract only of KR10-2015-0071090, 1 page.
Machine translation of BR PI0601647 (Abstract Only Available), 1 page.
Machine translation of JP H09188587, 9 pages.
Machine translation of JP2013-177287, 17 pages.
Machine translation of CN105884424 (Abstract Only Available), 1 page.
International Search Report and Written Opinion dated Nov. 23, 2017 in related PCT/US2017/03704, 13 pages.
International Search Report and Written Opinion dated Jun. 7, 2018 in corresponding PCT/US2018/019526 filed Feb. 23, 2018.
Rutland, David W., Manual for Determining Physical Properties of Fertilizer, International Fertilizer Development Center, PO Box 2040, Muscle Shoals, Alabama 35662, Sep. 1986, pp. 51-52, pp. 67-68.
Cultivar, Produquimica to launch Sulfurgran B-Max at World Fertilizer Congress, Oct. 14, 2014, 2 pages.
Cultivar, Produquimica presents first granulated sulfur, May 2, 2009, 2 pages.
Office Action dated Mar. 11, 2019 in related U.S. Appl. No. 15/611,655, 8 pages.
Office Action dated Nov. 14, 2019 in co-pending U.S. Appl. No. 15/903,300, filed Feb. 23, 2013, 20 pages.
Office Action dated Feb. 12, 2020 in co-pending U.S. Appl. No. 15/903,300, filed Feb. 23, 2018, 14 pages.

* cited by examiner

GRANULAR FERTILIZERS COMPRISING MACRONUTRIENTS AND MICRONUTRIENTS, AND PROCESSES FOR MANUFACTURE THEREOF

RELATED APPLICATIONS

The present application claims the priority benefit of U.S. Provisional Patent Application No. 62/462,735, filed Feb. 23, 2017, entitled GRANULAR FERTILIZERS COMPRISING MACRONUTRIENTS AND MICRONUTRIENTS, AND PROCESSES FOR MANUFACTURE THEREOF, incorporated by reference herein.

FIELD OF THE INVENTION

The present invention relates to granular fertilizers comprising macronutrients and/or micronutrients.

BACKGROUND OF THE PRESENT INVENTION AND PRIOR ART

Frequently, fertilizers are applied in the soil to supply plants with: primary macronutrients like nitrogen, phosphorus and potassium; secondary macronutrients like calcium, sulfur and magnesium; and micronutrients like zinc, boron, copper, manganese and molybdenum.

Nitrogen and potassium are the two nutrients for which plants have the highest demand. Potassium chloride has been the primary source of potassium for the fertilizer industry. The primary commercially available forms of potassium fertilizers are powder and granular. However, due to the high solubility of potassium chloride, a significant portion of the product is often lost by leaching, leading to a relatively low efficiency of these products.

Typically, plants require magnesium at from about 10 to 40 kg/hectare. Magnesium deficiencies occur frequently in acidic soils and are often exacerbated by high applications of potassium.

Typically, plants require 10 to 30 kg of sulfur per hectare, although some plants have a higher sulfur demand. The sulfur is often applied indirectly to the cultures, as components of some fertilizers such as superphosphate, ammonium sulfate and potassium sulfate, or plaster that is a by-product of phosphoric acid production.

Magnesium sulfate is one source of magnesium and sulfur for plants. However, magnesium sulfate is very soluble and consequently can be washed away by rainfalls. Furthermore, magnesium sulfate must be applied to the soil in multiple applications in order to provide the desired amounts of magnesium and sulfur, because a considerable portion of magnesium becomes "locked" in the soil, making it unavailable for the plants. Besides that, the application of high amounts of this product to the soil at a single time significantly elevates the salinity of the soil.

Micronutrients are agriculturally important, helping plants alleviate environmental stress, improving the nutrition quality of foods and providing higher crop production. Such micronutrients comprise boron, chlorine, copper, iron, manganese, molybdenum, nickel, and/or zinc.

Though soil conditions vary from case to case, boron-and-zinc-deprived soil conditions have frequently limited plant growth and crop production around the world. Other soil conditions where copper and other micronutrients may (also) be deprived warrant solutions as well.

How and/or how often micronutrients are applied to soil to improve the conditions are important:

Boron has a high leaching possibility, so at least the yearly application is recommended.

Copper is often complexed with an organic matter in soil.

The availability of manganese is very affected by the pH range, the microbiota and the humidity of soil.

Zinc is highly adsorbed in the clay and organic matter of tropical soil. For example, 30-60% of the adsorbed zinc may be complexed with $Fe_2O_3$ hydrate (goethite).

Micronutrients can be conventionally supplied to plants as salts, oxides, or directly in the form of minerals, such as ulexite, colemanite, hydroboracite as an example for boron. When used in insoluble forms, the nutrients are made available through the action of organic acids produced by microorganisms present in the soil and/or by the roots of plants; these reactions are quite slow, requiring long periods of time for total use of the nutrients. The micronutrient sources are quite variable as to their physical state, chemical reactivity/bioavailability, cost and availability.

Application of micronutrients together with macronutrients or inert carriers has been done as a way to improve nutrient distribution in the soil, because the recommended doses of micronutrients per hectare are typically quite low. For example, some manufacturers developed macronutrient fertilizers with micronutrients agglutinated on the outer surface thereof which allowed for more consistent application of the nutrients to the soil. However, friction between granules during handling, transport and storage can result in the removal of the agglutinated micronutrients from the surface of these granules. On the other hand, other manufacturers combined macronutrients and soluble micronutrients by using a melting step in the manufacturing process which eliminates losses due to abrasion and segregation during application of the products. However, those products have high production cost.

Fertilizers currently used for application in the soil are typically in granular form. In comparison with powder fertilizers, granular fertilizers are easy to handle, being easily transported, stored and applied. In comparison with other products such as those in the form of pellets or granules of indefinite physical appearance and low granule size uniformity, granular fertilizers show greater fluidity and a low tendency to create dust, as a consequence of their spherical form.

One of the biggest challenges in the prior art of granulation processes is the low uniformity of the granules produced, characterized by the variability of the granules' size profiles and also by the shape of these granules, both directly impacting the moisture, the hardness and the sphericity of the finished product.

Another issue arises in the prior art with the homogenization of the mixture that is fed into the granulator. As discussed below, homogenization in the process of the present invention promotes consistency of the finished product, so that all the granules have substantially the same chemical composition and that all the ingredients (agglomerative, dispersants, rheology agent, etc.) are well dispersed and homogenized in the mixture.

The recycling of the rejected granules, that is, the granules that are outside the desired size profile, is a key part of the process of the present invention. This key part of the process is particularly essential to guarantee the uniformity of the finished fertilizer granules containing macronutrients and micronutrients. As further discussed below, this key part of the process is particularly important for granulation of potassium salts for the purpose of promoting contact between the recycled material and the material that is being granulated in the plate, leading to an increase in the hardness of the finished product.

Dust generated during the granulation process must be controlled. Depending on the materials to be granulated, the dust may cause a potentially unhealthy environment or even a potentially explosive environment.

SUMMARY OF THE INVENTION

As discussed herein, the present invention relates granular fertilizers having a high degree of uniformity in the granules' size profile, controlled moisture, hardness and sphericity. The granules include primary macronutrients like nitrogen and phosphorus; secondary macronutrients like calcium, sulfur and magnesium; and micronutrients like zinc, boron, copper, manganese and molybdenum.

In one embodiment, the invention provides a fertilizer granule. The fertilizer granule has a generally spherical shape and an average particle dimension of between about 2.00 mm and about 4.00 mm. The fertilizer granule also has a hardness of at least 1.5 kgf and a sphericity of at least 85%.

In another embodiment, the invention provides a preparation of fertilizer granules. Each respective fertilizer granule has a generally spherical shape and an average particle dimension of between about 2.00 mm and about 4.00 mm. Each respective fertilizer granule also has a hardness of at least 1.5 kgf and a sphericity of at least 85%.

DETAILED DESCRIPTION OF THE PREFERRED EMBODIMENTS

Figure 1:
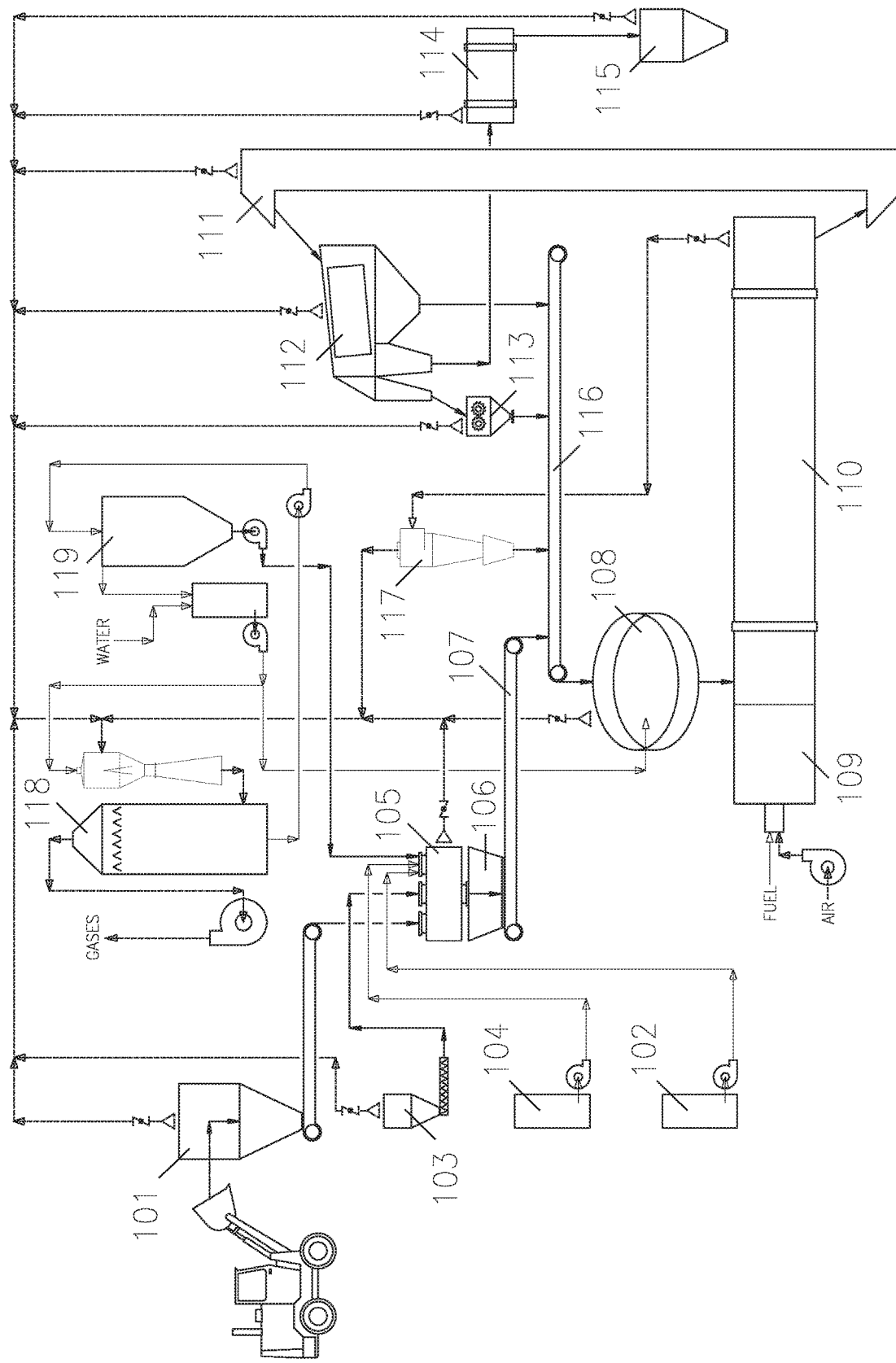
FIG. 1 is an overview of the process of the present invention to produce a granular fertilizer containing macronutrients and micronutrients as described herein.

Unless defined otherwise, all technical and scientific terms used herein have the same meaning as commonly understood by one of ordinary skill in the art to which the present invention belongs. Although any methods and materials similar or equivalent to those described herein can be used in the practice or testing of the present invention, the preferred methods and materials are now described. All publications mentioned hereunder are incorporated herein by reference.

As will be known by those of skill in the art, there are several methods for determining hardness, for example by determining the crushing strength of the granules or the impact resistance of the granules. For example, in some embodiments, a suitable method for determining the hardness of a fertilizer granule prepared according to the invention is the use of a device similar to a Tablet Hardness Tester.

It is of note that such devices are well-known in the pharmaceutical arts and a wide variety of such devices are known in the art.

As will be appreciated by one of skill in the art, the term "additivation" is often used to refer to a process of adding ingredients intended to "guarantee a high finished product stability." As discussed herein, the purpose of these additives is to confer specific qualities to the mixture during the mixing, granulation and drying stages, for example but by no means limited to wettability, adhesivity, reduction of the melting temperature and the like, or even to confer specific properties to the finished product, for example but by no means limited to solubility, capacity for disintegration in the soil, availability of nutrients, and the like.

Described herein are: a granular fertilizer comprising potassium chloride; a granular fertilizer comprising high concentrations of zinc, manganese, copper, and boron; and a granular fertilizer comprising magnesium and sulfur.

In some embodiments, granulation aids are added to the granular fertilizer formulations which promote the formation of fertilizer granules having the desired sphericity, size and hardness. Suitable granulation aids include but are by no means limited to sugar, starch, modified starch, kaolin, lignosulfonates, molasses, bentonites, gypsum, limestone, silica and mixtures thereof. In some embodiments, the granulation aids may be added at a concentration of about 2.0% w/w to about 7.0% w/w, or of about 2.0% w/w to about 5.0% w/w. In other embodiments, the granulation aids may be added at about 5.0% w/w or no greater than 5.0% W/W.

As used herein, a "preparation" refers to a plurality of an item, for example, of fertilizer granules or particles of granular fertilizer. For example, a preparation may be or may comprise a production of 0.1, 1.0, 10, 25 t/h of fertilizer granules wherein all members of the preparation have or share a high degree of uniformity in size profile, hardness and sphericity. For example, in some embodiments, each member of the preparation, that is, each fertilizer granule, has at least about 85% sphericity, hardness greater than about 1.5 kg/granule and moisture content of less than about 5% w/w. There may also be less than 5% variability in the content of any given granule compared to any other granule within the preparation.

The term "mesh" appearing herein means the measurement of particle size in Tyler Mesh Size.

Granular Fertilizers Comprising Potassium

In one embodiment of the invention, there is provided a granular fertilizer comprising potassium chloride. In some embodiments, the formula may include micronutrients.

The potassium is water soluble and in some embodiments is present at a minimum concentration of about 53% $K_2O$ w/w or about 44% K w/w (preferably from about 44% to about 70%, and more preferably from about 50% to about 60%) when the fertilizer granule comprises potassium as the only nutrient.

In other embodiments, the potassium is present at a minimum concentration of about 22% $K_2O$ w/w (preferably from about 22% to about 50%, and more preferably from about 25% to about 35%) or about 18% K w/w as potassium chloride (preferably from about 18% to about 40%, and more preferably from about 25% to about 35%) when the mixture comprises one or more micronutrients such as but by no means limited to boron, copper, manganese and zinc, wherein each micronutrient is present at a minimum concentration of about 0.5% of the fertilizer granule by weight/weight, preferably from about 0.5% to about 20%, and more preferably from about 3% to about 12%.

One purpose of this granular fertilizer is to supply crops with a primary macronutrient, such as potassium, combined with at least one micronutrient, such as boron, copper, manganese and/or zinc. In some embodiments, the components in these formulations are water soluble, thereby promoting immediate absorption of nutrients.

The sources of potassium which may be used in the process of manufacturing the fertilizer granules include potassium salts, such as but by no means limited to potassium chloride and potassium sulfate. In a preferred embodiment, the source of potassium is potassium chloride with a minimum content of about 58% $K_2O$ w/w or about 48% K w/w.

Regarding the amounts of micronutrients provided below, the percentage recited is the minimum percentage of the element being targeted for delivery (e.g., boron) from the full compound, with the full compound being added at least about 0.5% of the granular fertilizer by weight/weight, as discussed above.

The sources of boron which may be used in the granulation process include disodium octaborate with a minimum content of about 20% B w/w, sodium pentaborate with a minimum content of about 18% B w/w, sodium tetraborate (borax) with a minimum content of about 11% B w/w and mixtures thereof.

The sources of copper that may be used include but are by no means limited to copper chloride with a minimum content of about 30% Cu w/w, copper nitrate with a minimum content of about 22% Cu w/w, copper sulphate with a minimum content of about 24% Cu w/w and mixtures thereof.

The sources of manganese may be but are by no means limited to manganese chloride with a minimum content of about 25% Mn w/w, manganese nitrate with a minimum content of about 16% Mn w/w, manganese sulfate with a minimum content of about 20% Mn w/w and mixtures thereof.

The sources of zinc may be but are by no means limited to zinc chloride with a minimum content of about 30% Zn w/w, zinc nitrate with a minimum content of about 18% Zn w/w, zinc sulfate with a minimum content of about 20% Zn w/w and mixtures thereof.

In some embodiments, the granule can be coated so as to promote slow release of the nutrients, so that the crops are supplied with nutrients over an extended period of time. As discussed herein, the coating comprises elemental sulfur from about 11% w/w to about 16% w/w and a polymeric material from about 1.4% w/w to about 3.0% w/w of the fertilizer granule.

With the coating, a fertilizer containing at least about 42% $K_2O$ w/w or about 35% K w/w as potassium chloride is obtained in the case of potassium only as a nutrient and with a concentration of about 18% $K_2O$ w/w or 15% K w/w in the form of potassium chloride when the fertilizer also contains at least one micronutrient such as boron, copper, manganese or zinc (with a minimum concentration of about 0.30% of the micronutrient by weight/weight of the granule).

As discussed above, the granulation aids may be but are by no means limited to sugar, starch, modified starch, kaolin, lignosulfonates, molasses, bentonites, gypsum, limestone, silica and mixtures thereof. In some embodiments, the granulation aids are present at a concentration of 5.0% w/w or less. In a preferred embodiment, the granular fertilizer comprises 2.5% calcium lignosulfonate w/w and 2.5% bentonite w/w. Both contribute to the agglomeration capacity of the granule and the hardness on the finished product. For coated fertilizer granules, a low-swelling bentonite capable of absorbing less than about 7 ml of water per 2 g of clay is preferred.

This granular fertilizer comprising potassium and optionally micronutrients and including a slow release technology is manufactured by wet granulation, as discussed herein. The final product has at least about 75% (preferably at least about 85%, more preferably at least about 95%, and even more preferably about 98%) sphericity; hardness of at least about 1.2 kgf/granule (preferably at least about 1.5 kgf/granule, and more preferably from about 1.5 kgf/granule to about 4 kgf/granule), and moisture content less than about 8% w/w, (preferably less than about 5%, and more preferably less than about 2%).

As used herein, % sphericity is determined as defined by the Manual for Determining Physical Properties of Fertilizer, September 1986, pages 67-68, incorporated by reference herein. In summary, that method involves distributed 250 g of the granules to be tested over an inclined (10° from horizontal) conveyor belt moving at 380 cm/min. Round granules will move down the plane while distorted or broken granules will be carried up the include by the moving belt. Thus, round ("true) and "non-round" ("reject") granules are discharged at separate locations, after which the total weight of each group is measured so that % sphericity can be calculated as follows:

$$\text{Sphericity value, \%} = \frac{\text{True Granules, g}}{\text{True + Reject Granules, g}} \times 100$$

As used herein, hardness, or "granule crushing strength" is determined as defined in the Manual for Determining Physical Properties of Fertilizer, September 1986, pages 51-52, incorporated by reference herein. In summary, this test involves using a commercial, hand-powered compression tester (e.g., a Chatillon Compression Tester) that is operably connected to a gauge for measuring the force needed to fracture a test granule (in units kg/granule or kgf/granule). At least 25 granules are tested, and the average of the force needed to fracture each of those 25 granules is determined, with that average being deemed the hardness of that sample.

Granular Fertilizer Comprising Magnesium, Sulfur, and Clay

In one embodiment of the invention, there is provided a concentrated granular magnesium fertilizer. As discussed herein, the granule has desirable hardness and disintegrates in water.

In some embodiments, the granular magnesium fertilizer comprises a mixture of magnesium (about 10% w/w to about 50% w/w, preferably about 15% w/w to about 30% w/w, more preferably about 15% w/w to about 25% w/w) and sulfur (about 10% w/w to about 60% w/w preferably about 20% w/w to about 40% w/w, and more preferably about 25% w/w to about 35% w/w), with all percentages being by weight and based upon the total product weight taken as 100% by weight.

In the preferred embodiment, the quantity of magnesium and sulfur added corresponds to the mass ratio based on their stoichiometric reaction, which means 1.3 g of sulfur for each gram of magnesium.

In some embodiments, the granular magnesium fertilizer comprises (consists of, or consists essentially of) magnesium oxide (about 28% w/w to about 60% w/w, preferably about 35% w/w to about 50% w/w), elemental sulfur (about 20% w/w to about 42% w/w, preferably about 25% w/w to about 35% w/w), high swelling clay such as montmorillonite (about 6% w/w to about 18% w/w) and binders (about 2% w/w to about 7% w/w). In one embodiment, the inventive granules comprise less than about 5% by weight, preferably less than about 2% by weight, more preferably less than about 1% by weight, and even more preferably about 0% by weight of ingredients other than magnesium oxide, elemental sulfur, clay, and binders, wherein the percentage by weight is based on the granule taken as 100% by weight. As will be appreciated by one of skill in the art, any suitable binder, for example but by no means limited to, sugar, starch, modified starch, lignosulfonates, sugarcane molasses or combinations there, may be used. The binders or granulation aids are used to "build up" the granules during the manufacturing process, as discussed herein.

The source of magnesium may be but is by no means limited to magnesium oxide with a minimum content of about 48% Mg w/w, magnesium-based minerals such as magnesite and dolomite, and mixtures thereof.

The source of sulfur is elemental sulfur, with a minimum content of about 95% sulfur w/w.

The montmorillonite-type clay may have a swelling capacity in water such that 2 g of clay can absorb about 30 ml of water. As a result of this arrangement, the granule will disintegrate in contact with water. Natural or synthetic sodium bentonites are examples of clays that can be used for this purpose, although other suitable clays will be readily apparent to one of skill in the art.

The binders or granulation aids promote efficient granulation, which reduces the amount of material that must be recycled within the process. Second, soluble binders provide greater water permeability within the granule, accelerating the swelling of the clay which in turn promotes disintegration of the granule.

In some embodiments, the use of an acid, such as but by no means limited to sulfuric acid or phosphoric acid, enhances the disintegration of the granules, working in synergy with montmorillonite-type clay. As will be appreciated by one of skill in the art, the use of an acid also contributes to the hardness of the granules. If the acid is phosphoric acid, the formulation will preferably comprise phosphorous as a macronutrient. The amount of acid in the final product may not exceed 5% w/w. In certain such embodiments, the granular magnesium fertilizer comprises (consists of, or consists essentially of) magnesium oxide, elemental sulfur, montmorillonite clay, binders, and an acid.

The addition of high swelling clay enables rapid disintegration of the granule, allowing the soil bacteria to oxidize elemental sulfur to sulfate, which reacts with the magnesium oxide to form magnesium sulfate. It also allows that, after granule disintegration, the finely divided magnesium oxide is available for action of the organic acids produced by the roots of the plants, providing magnesium ions to the plant.

In one embodiment, the components of the granular magnesium fertilizer comprises (consists of, or consists essentially of): magnesium oxide (MgO) 48.12% w/w, elemental sulfur 35.38% w/w, calcium lignosulfonate 2.00% w/w, molasses 2.50% w/w, and montmorillonite clay 12.00% w/w. In one embodiment, the components of the granular magnesium fertilizer comprises (consists of, or consists essentially of): magnesium oxide, elemental sulfur, calcium lignosulfonate, molasses, montmorillonite clay, and an acid. In one embodiment, the inventive granules comprise less than about 5% by weight, preferably less than about 2% by weight, more preferably less than about 1% by weight, and even more preferably about 0% by weight of ingredients other than magnesium oxide, elemental sulfur, calcium lignosulfonate, molasses, montmorillonite clay, and acid, wherein the percentage by weight is based on the granule taken as 100% by weight.

The process for manufacturing this granular fertilizer comprising magnesium, sulfur and clay is a wet granulation process, as discussed herein. The final product has at least about 75% (preferably at least about 85%, more preferably at least about 95%, and even more preferably about 98%) sphericity; hardness of at least about 1.2 kgf/granule (preferably at least about 1.5 kgf/granule, and more preferably from about 1.5 kgf/granule to about 4 kgf/granule), and moisture content less than about 8% w/w, (preferably less than about 5%, and more preferably less than about 2%). The final product also disperses in water in less than 20 minutes. In certain embodiments, the granules have an average particle dimension of between about 2.00 mm (about 10 mesh) and about 4.00 mm (about 5 mesh), and preferably between about 2.36 mm (about 8 mesh) and about 3.35 mm (about 6 mesh).

Granular Fertilizer Comprising Totally Soluble Micronutrients and Aluminosilicate In another embodiment of the invention, there is provided a granular fertilizer comprising high concentrations of zinc, manganese, copper and boron. The formula also includes aluminosilicate, which promotes nutrient retention in the soil, and granulation aids, which promote the formation of a highly spherical granular fertilizer having high hardness.

In some embodiments, the formula comprises (consists of, or consists essentially of) zinc (about 3% w/w to about 22% w/w, preferably about 7% w/w to about 15% w/w, and more preferably about 7% w/w to about 11% w/w), manganese (about 3% w/w to about 22% w/w, preferably about 7% w/w to about 15% w/w, and more preferably about 7% w/w to about 11% w/w), copper (about 1% w/w to about 10% w/w, and preferably about 2% w/w to about 4% w/w), boron (about 1% w/w to about 10% w/w, and preferably about 2% w/w to about 4% w/w) and hydrated aluminosilicate (about 10% w/w to about 35% w/w, and preferably about 15% w/w to about 25% w/w). In one embodiment, the formula comprises less than about 5% by weight, preferably less than about 2% by weight, more preferably less than about 1% by weight, and even more preferably about 0% by weight of ingredients other than zinc, manganese, copper, boron, and hydrated aluminosilcate, wherein the percentage by weight is based on the granule taken as 100% by weight. As discussed herein, binders or granulation aids are added to promote the formation of highly spherical and hard granules. In this embodiment, the granulation aids may be added at low concentrations, for example, about 1% w/w to about 10% w/w of low water swelling clay (about 2% w/w to about 5% w/w) and a binding agent (about 2% w/w to about 5% w/w). The foregoing percentages are those of the element being targeted for delivery. In certain such embodiments, the formula comprises (consists of, or consists essentially of) zinc, manganese, copper, boron, hydrated aluminosilicate, and one or more binders. In one embodiment, the formula comprises less than about 5% by weight, preferably less than about 2% by weight, more preferably less than about 1% by weight, and even more preferably about 0% by weight of ingredients other than zinc, manganese, copper, boron, hydrated aluminosilicate, and binders, wherein the percentage by weight is based on the granule taken as 100% by weight.

The function of the hydrated aluminosilicate is to retain the nutrients, such as boron, copper, manganese and zinc, and release them to the crops when needed. The aluminosilicate reduces nutrient losses from leaching, improves the quality of the soil and enhances the improvement in plant growth.

The source of boron may be, but is by no means limited to, disodium octaborate with a minimum content of about 20% B w/w, sodium pentaborate with a minimum content of about 18% B w/w, sodium tetraborate (borax) with a minimum content of about 11% B w/w, and mixtures thereof.

The source of copper may be but is by no means limited to copper chloride with a minimum content of about 30% Cu w/w, copper nitrate with a minimum content of about 22% Cu w/w, copper sulfate with a minimum content of about 24% Cu w/w, and mixtures thereof.

The source of manganese may be but is by no means limited to manganese chloride with a minimum content of about 25% Mn w/w, manganese nitrate with a minimum content of about 16% Mn w/w, manganese sulfate with a minimum content of about 20% Mn w/w, and mixtures thereof.

The source of zinc may be but is by no means limited to zinc chloride with a minimum content of about 30% Zn w/w, zinc nitrate with a minimum content of about 18% Zn w/w, zinc sulfate with a minimum content of about 20% Zn w/w, and mixtures thereof.

The source of hydrated aluminosilicate may be, but is by no means limited to, natural zeolites, such as clinoptilolite and phillipsite. The inner channels of zeolite, by virtue of their uniform molecular structure, are occupied by interchangeable cations and water, offering high absorption and adsorption capacity, as discussed herein. This material also imparts hardness to the finished product.

The granulation aids (binders) may be but are by no means limited to sugar, starch, modified starch, kaolin, lignosulfonates, molasses, bentonites, gypsum, limestone, silica and mixtures thereof, limited to a concentration of about 5.0% w/w. Specifically, the granulation aids are selected based on their contribution to agglomeration capacity and hardness of the finished product.

The low water-swelling clay should be a clay that absorbs less than about 7 ml of water per 2 g of clay, for example, a low water swelling montmorillonite-type clay. Natural calcium bentonites are clays that can be used for this invention. The clay promotes binding during the formation of the granule and also imparts sphericity and hardness to the granule formed.

In some embodiments, the zinc is in the form of zinc sulfate monohydrate (about 15% w/w to about 30% w/w), the manganese is in the form of manganese sulphate monohydrate (about 20% w/w to about 35% w/w), the copper is in the form of copper sulphate monohydrate (about 5% w/w to about 12% w/w), the boron is in the form of sodium octaborate (about 10% w/w to about 20% w/w), clinoptilolite (about 15% w/w to about 25% w/w), calcium lignosulfonate (about 2% w/w to about 5% w/w) and bentonite (about 2% w/w to about 5% w/w). While this formulation uses nutrients whose sources are highly soluble, clinoptilolite acts as a nutrient retention agent, as discussed herein. Thus, in certain such embodiments, the formula comprises (consists of, or consists essentially of) zinc sulfate monohydrate, manganese sulphate monohydrate, copper sulphate monohydrate, sodium octaborate, clinoptilolite, calcium lignosulfonate, and bentonite. In one embodiment, the formula comprises less than about 5% by weight, preferably less than about 2% by weight, more preferably less than about 1% by weight, and even more preferably about 0% by weight of ingredients other than zinc sulfate monohydrate, manganese sulphate monohydrate, copper sulphate monohydrate, sodium octaborate, clinoptilolite, calcium lignosulfonate, and bentonite, wherein the percentage by weight is based on the granule taken as 100% by weight.

The finished product presents a high concentration of manganese (about 7% w/w to about 11% w/w), zinc (about 7% w/w to about 11% w/w), boron (about 2% w/w to about 4% w/w) and copper (about 2% w/w to about 4% w/w) in the same granule and provides these nutrients to plants slowly and gradually, because of the addition of hydrated aluminosilicate type clinoptilolite (about 15% w/w to about 25% w/w) in the formulation. As discussed herein, the hydrated aluminosilicate has a network which promotes ion exchange, retaining in its structure the nutrients in the form of ions, which reduces leaching and allows for the most efficient assimilation of nutrients by the plant, as discussed herein.

This granular fertilizer comprising totally soluble micronutrients and aluminosilicate is manufactured by a wet granulation process, as discussed herein. The finished product has at least about 75% (preferably at least about 85%, more preferably at least about 95%, and even more preferably about 98%) sphericity; hardness of at least about 1.2 kgf/granule (preferably at least about 1.5 kgf/granule, and more preferably from about 1.5 kgf/granule to about 4 kgf/granule), and moisture content less than about 8% w/w, (preferably less than about 5%, and more preferably less than about 2%). In certain embodiments, the granules have an average particle dimension of between about 2.00 mm (about 10 mesh) and about 4.00 mm (about 5 mesh), and preferably between about 2.36 mm (about 8 mesh) and about 3.35 mm (about 6 mesh).

Granular Fertilizer Manufacturing Process

In accordance with the information herein, it is an objective of the present invention to present a process, for example as shown in FIG. 1, to manufacture a granular fertilizer containing macronutrients and micronutrients as described herein.

In some embodiments, a system for the process comprises a mixer, a granulator plate, a dryer, a size sorter, a cooler and a dust capturing and recovering system.

In other embodiments, the system includes a grinder for reducing the sizes of the raw materials or fertilizer ingredients to their desired size profile.

For example, in some embodiments, as discussed herein, the raw materials or fertilizer ingredients have a size profile such that: at least about 90% (preferably about 100%) passes through 18 mesh opening; at least about 70% (preferably at least about 90%) passes through 60 mesh opening; and at least about 40% (preferably at least about 60%) passes through 100 mesh opening.

It is noted that other suitable size profiles of the raw materials or fertilizer ingredients are within the scope of the present invention and may be used in some embodiments to produce a granular fertilizer containing macronutrients and micronutrients described herein, with certain desirable properties such as particular granule sizes and/or shapes.

As discussed herein, mixer 105 in FIG. 1 is arranged for mixing of the raw materials or fertilizer ingredients for a granular fertilizer containing macronutrients and micronutrients as described herein. In preferred embodiments, the mixer is arranged for the raw materials or ingredients to be homogenously and sufficiently mixed, such that there is less than about 5% variability in the contents or formulation of any given granule from one batch of granules prepared in accordance with the process of the present invention.

The mixer, during the homogenization of the raw materials or fertilizer ingredients as discussed herein, comprises a plurality of atomizing and/or suitable nozzles for the addition of acids, additives, and water containing dissolved and insoluble solids.

Granulator plate 108 in FIG. 1 is arranged at an inclination angle of between about 50° and about 75° relative to the ground and is arranged to rotate at a speed of between about 10 remand about 15 rpm.

The granulator plate further comprises a plurality of scrapers. In some embodiments, there is a moveable scraper for cleaning the bottom of the granulator plate and a fixed scraper arranged to clean the edge of the granulator plate, as discussed herein.

The granulator plate is further arranged such that a plurality of nozzles injects water on the raw materials or ingredients onto the plate. In a preferred embodiment, the water is from the gas washing and water treatment system, free of insoluble solids.

The dryer comprises a rotary dryer. In some embodiments, the rotary dryer is arranged to complete the granulation process and to supply sufficient heat for further drying of the finished granules. For example, the first quarter of rotary dryer may have a substantially smooth interior so that the fertilizer granules are dried with reduced agitation. Specifically, as discussed herein, this initial drying completes the granulation process, promoting smoothness and hardness to the granules. The additional three quarters of the dryer may include lifting flights, which agitate the fertilizer granules to a much greater extent and promote overall drying of the fertilizer granules. As such, in some embodiments, the initial drying promotes completion of the granulation process and the later drying acts to dry the entire fertilizer granule more thoroughly.

The size sorter separates out those granules which are either above or below the desired size range. In some embodiments, the size sorter may also be arranged to separate out granules that are outside of their desired shape profile, for example, granules that are insufficiently spherical.

The dust capturing and recovering system is arranged to return dust generated during transportation of the raw materials or fertilizer ingredients between stages of the process as well as during processing at each stage. As will be appreciated by one of skill in the art and as discussed herein, the dust can be returned to the granulator plate or to the mixer once it passes through and has been recovered by cyclone system 117 or the gas washing system 118. The dust captured in the cyclone system 117 returns as powder to the granulator plate, carried by the belt conveyor 116. Specifically, the dust captured in the gas washing system, is mixed with water and returns as a solution, if the solids are soluble in water, and/or a suspension, if the solids are insoluble in water. The water containing dissolved solids, separated in the water treatment system 119, is injected onto material either in the mixer or on the granulator plate, as discussed herein, while the water containing suspended solids is injected onto material only in the mixer, otherwise the spray nozzle of granulation water would get plugged. Specifically, the use of water comprising dissolved raw materials or fertilizer ingredients for pre-granulation in the mixer and/or for granule formation in the granulator plate helps to promote greater hardness and smoothness to the finished products, as discussed herein.

According to another aspect of the present invention, a method for preparation of granular fertilizers comprises:

a) providing a quantity of raw materials, fertilizer ingredients and/or other ingredients for a granular fertilizer;

b) mixing the quantity while injecting reagents into the mixture, thereby providing a pre-granulated mixture;

c) transferring the pre-granulated mixture to a granulator plate;

d) spraying water comprising dissolved solids into the mixture on the granulator plate;

e) collecting formed granules from the granulator plate;

f) drying the granules; and g) sizing the granules.

In some embodiments, prior to step (a) the raw materials or ingredients are subjected to grinding such that they have a size profile wherein at least about 90% (preferably about 100%) passes through 18 mesh opening; at least about 70% (preferably at least about 90%) passes through 60 mesh opening; and at least about 40% (preferably at least about 60%) passes through 100 mesh opening.

In some embodiments, prior to step (a) the moisture of the raw materials or fertilizer ingredients is adjusted so as to be lower than about 10%, as discussed below.

In some embodiments, one of the reagents added at step (b) is water comprising suspended and/or dissolved solids, as discussed herein. Preferably, the amount of water added cannot surpass more than about 12% of the total weight of the mixture.

In some embodiments, the granulator plate is arranged such that it is at an angle of between about 50° to about 75° relative to the ground and such that the granulator plate revolves at between about 10 to about 15 revolutions per minute.

In some embodiments, the granules are sized such that granules having an average dimension of between about 9 mesh and about 5 mesh are retained and granules outside that range are recycled, as discussed herein.

According to another aspect of the present invention, there is provided a method for preparation of granular fertilizers comprising:

a) providing a quantity of raw materials, fertilizer ingredients, and/or other ingredients with a size profile to make a granular fertilizer, such that about 100% pass through an approximately 18 mesh opening; at least about 70% pass through an approximately 60 mesh opening; and at least about 40% pass through an approximately 100 mesh opening;

b) mixing the quantity while injecting reagents into the mixture, thereby providing a pre-granulated mixture;

c) transferring the pre-granulated mixture to a granulator plate, said granulator plate being at an angle of between about 50° to about 75° relative to the ground, said granulator plate revolving at a speed of between about 10 to about 15 revolutions per minute;

d) spraying water comprising dissolved solids into the mixture on the granulator plate, said dissolved solids comprising dust recovered from the whole system;

e) collecting formed granules from the granulator plate;

f) drying the granules; and g) sizing the granules wherein the granules between about 9 mesh and about 5 mesh are retained, and the rejected granules are recycled to step (c).

As discussed herein, the process of the present invention comprises a semicontinuous system divided into eight main stages, in which the feeding, homogenization, acidulation, additivation and/or hydration stages occur in batches, and the granulation, drying and sieving stages occur continuously.

Prior to the feeding stage, the raw materials, fertilizer ingredients, and/or other ingredients of mineral and/or organic nature must be characterized as to proportion of chemical elements, moisture and granule size. The first of these is indispensable in the formulation in order to guarantee the nutritional supply of the finished product. As discussed herein, the latter two are extremely important for the granulation process, impacting the fluidity of the raw materials or fertilizer ingredients, especially at the beginning of the process.

Specifically, as will be appreciated by one of skill in the art, a fertilizer granule manufactured by the process of the present invention may comprise a wide variety of raw materials and fertilizer ingredients, depending on the intended use and the desired performance characteristics.

Normally, raw materials or fertilizer ingredients are evaluated as to the proportion of primary macronutrients like nitrogen, phosphorus and potassium; secondary macronutrients like sulfur, calcium and magnesium; and micronutrients like zinc, boron, copper, manganese and molybdenum. There is also special concern with heavy metals like lead, cadmium, mercury and arsenic, the content of which must not exceed the limits set by local legislation.

The desired size profile of raw materials or fertilizer ingredients is at least about 100% passing through approximately 18 mesh openings, at least about 70% passing through approximately 60 mesh openings and at least about 40% through approximately 100 mesh openings. In case of raw materials or fertilizer ingredients with larger profiles, before feeding them into the granulation process, their profile size may be reduced, for example, by milling prior to use, so as to promote good distribution.

The moisture of the raw materials or fertilizer ingredients must not exceed about 10% w/w, depending on the source. It is important to evaluate their appearance, because it is not just free water that produces moisture. Water of crystallization also contributes to but normally has less of an impact on the fluidity of the raw materials or fertilizer ingredients. If the moisture of the raw material or fertilizer ingredients is over about 10% w/w, a prior drying stage may be required. Alternatively, premixing of the raw materials or fertilizer ingredients exceeding the desired moisture with other sources of drier macro- and/or micronutrients may result in a mixture with the desired moisture and therefore with greater fluidity.

In the present invention, "raw material" or "fertilizer ingredient" includes any source of nutrient claimed in the formulation of the finished product, and "other ingredient" or "reagent" refers to any substance that may improve some aspects of the finished product, such as hardness, stability, and the like, and/or enhance other aspects of the manufacturing process, such as fluidity, agglomeration, and the like, but does not supply any nutrient. For example, for the granular fertilizer comprising magnesium, sulfur and clay, magnesium oxide and elemental sulfur are examples of raw material, while montmorillonite clay, calcium lignosulfonate and molasses are examples of other ingredients. "Ingredients" is broadly used to encompass raw materials/fertilizer ingredients as well as other ingredients/reagents.

The choice of raw materials, fertilizer ingredients, and other ingredients in producing a granular fertilizer of the present invention also takes into consideration fundamental physical and chemical aspects like solubility, mobility in the soil, density, hygroscopicity, chemical interaction, agglomeration capacity, resulting pH, availability and cost. Accordingly, as will be appreciated by one of skill in the art, a wide variety of suitable raw materials or ingredients and corresponding formulations may be contemplated and are considered to be within the scope of the present invention. That is, unlike some prior art processes, the method described herein may be used for the production of a wide variety of fertilizer granules containing a granular fertilizer containing macronutrients and micronutrients as finished products.

The feeding of raw materials and/or ingredients in the granular fertilizer manufacturing process can be done individually, with the use of dosing threads or extracting straps, depending on the quantity and physical and chemical characteristics of the individual raw materials or ingredients, or directly in the form of a premixture of any source of macronutrients and/or micronutrients and/or ingredients. In either of the two cases, the moisture and size profile of raw materials or ingredients must be controlled.

In the present invention, the feeding of raw materials and/or ingredients is shown in FIG. 1 by hopper and extractor belt unit 101. From the supply point, the raw materials and/or ingredients go individually and/or as a premixture to mixer 105. As will be appreciated by one of skill in the art, other suitable methods for transporting raw materials and/or ingredients to the mixer are within the scope of the present invention.

Mixer 105 preferably has a large capacity and may rotate at more than about 100 rpm, that is, may have a minimum rotation of about 100 rpm on a central axis. In some embodiments, the mixer 105 comprises high shear choppers, and is represented for but by no means limited to a paddle mixer, a pin mixer and/or a plough shear mixer. As discussed herein, mixer 105 makes a homogeneous mixture of the raw materials and other ingredients necessary in the production of a granular fertilizer of the present invention. As discussed herein, in some embodiments, the stages of homogenization, acidulation, additivation, and hydration take place in the mixer.

In the present invention, the homogenization stage of the process is important to produce a homogeneous mixture of the raw materials which may be organic and/or inorganic in nature as well as the other added ingredients, as discussed herein. In some embodiments, the homogenization is such that the nutrient content of the finished fertilizer granules has a relative variation coefficient equal to or less than about 5%.

As will be appreciated by one of skill in the art, the homogenization time varies in accordance with many factors, for example, the specific raw materials or ingredients, the quantity thereof, and whether the raw materials or ingredients are added to the mixer in the form of a premixture or individually.

The acidulation stage of the process in the present invention involves the dosing of acid and/or acidic solutions directly in mixer 105. As will be apparent to one of skill in the art, the specific type of acid and the quantity thereof will vary in accordance with the desired agronomic characteristics of a granular fertilizer as the finished product, in relation to the solubility of the nutrients and other ingredients. For example, the acid or acidic solution may be selected so as to promote the availability of the specific nutrients in use or to assist in granulation, for example as agglomerative and/or hardening agents.

To promote mixing of the acids in the mixture, they may be sprayed on the whole internal revolving area of the mixer, for example, using atomizer nozzles. The dosage system is represented in a simplified way as a tank and dosing pump unit 102 in FIG. 1.

In the present invention, the additivation stage of the process comprises dosing solid and/or liquid additives into the mixture. As will be appreciated by one of skill in the art, the term "additivation" is often used to refer to a process of adding ingredients intended to "guarantee a high finished product stability." As discussed herein, the purpose of these additives is to confer specific qualities to the mixture during the mixing, granulation and drying stages, for example but by no means limited to wettability, adhesivity, reduction of the melting temperature and the like, or even to confer specific properties to the finished product, for example but by no means limited to solubility, capacity for disintegration in the soil, availability of nutrients, and the like. The solid or liquid additives may be added to the mixture by any suitable means known in the art, for example, by means of a hopper and dosing thread unit 103 and a tank and dosing pump unit 104, respectively, as shown in FIG. 1.

As is done for the raw materials or ingredients in the present invention, the solid additives must also have desired suitable moisture and size profile, in order to promote good distribution within the mixture. As discussed herein, liquid additives are prepared for application through the spray nozzles so as to promote good distribution within the mixture. Because of the organic nature of some additives, it is suggested that their application on the mixture happens after the application of the acids or acidic solutions, in particular for formulations that use moderate and/or strong acids so as to preserve the integrity of the additive.

In the present invention, the hydration stage of the process involves the addition of water to the mixture of mixer 105, prior to the granulation stage thereof. The objective is to generate microgranules that may act as granulation seeds on the next stage of the process, effectively transforming the intensive mixer into a pre-granulator. Because of this, the hydration stage is also called as pre-granulation stage. In some embodiments, the addition of water in the pre-granulation stage within the mixer better regulates the water used in the granulation stage, at which time the addition of water may have to be manually regulated.

As discussed herein, the water used in the hydration stage is mainly from the gas washing system and contains dissolved solids and/or solids in suspension. As discussed herein, the dissolved and/or suspended solids are recovered raw material and/or ingredients that became airborne either during or on the transport between the stages of feeding, mixing, pre-granulation, granulation, drying, sieving, milling and cooling. Specifically, dust generated during the process and captured by the gas washing system 118 returns to the process as a solution and/or a suspension after mixing the dust with water inside the scrubber. As discussed herein, the dust-containing water may also contain undissolved solids. These solids are separated from the water in the water treatment system 119 and returned to the process by mixer 105, while the water comprising the dissolved solids may be used either in the pre-granulation and granulation stages. In each embodiment of this invention, the "dissolved solids" in the water comprise one or more fertilizer ingredients, with preferred fertilizer ingredients being selected from the group consisting of boron, chlorine, copper, iron, manganese, molybdenum, nickel, zinc, nitrogen, phosphorus potassium, calcium, sulfur, magnesium, and mixtures thereof.

This recycle and return loop contributes to reducing losses in the process. The quantity of water used may vary from one formulation to another, but generally it does not exceed about 12% w/w in the mixture. When the quantity is otherwise above this value, the fluidity of the mixture is reduced, making it difficult to drain the mixture into a container, such as holding silo 106 as shown in FIG. 1. As will be apparent to one of skill in the art, the steps up to the pre-granulation stage are carried out in a batch process but the pre-granulated mixture can be used in a continuous process for the generation of suitable fertilizer granules containing macronutrients and micronutrients, as discussed herein. In some embodiments, the silo 106 regulates the transition between the two parts of the process, as discussed herein.

As shown in FIG. 1, after the pre-granulated mixture is unloaded from mixer 105 into holding silo 106, extractor belt 107 transfers the pre-granulated mixture to granulator plate 108, where the granulation stage is accomplished. The granulator plate operates at an inclination angle between about 50° and about 75° in relation to the ground (i.e., relative to the horizontal) and at rotation between about 10 rpm and about 15 rpm, depending on the formulation, optimizing the transformation of the pre-granulated mixture into granules of about 9 mesh to about 5 mesh.

The bottom and the edge of granulator plate 108 are made of smooth steel plate and are continuously kept clean by means of scrapers. In some embodiments, a movable scraper is provided for cleaning the bottom of the plate and a fixed scraper is provided for cleaning the edge. This cleanliness improves the efficiency of the process of the invention. Specifically, the cleaning of the plate allows the material to roll on a smooth surface, resulting in sphericity of at least about 85% for the finished product.

The granulator plate is arranged such that spraying nozzles provide suitable distribution of water onto the mixture in the plate. This water, used as a granulation vehicle, comes from the gas washing system and therefore contains dissolved solids. As discussed herein this water is free of solids in suspension, so as not to obstruct the nozzles.

The quantity of water sprayed on the plate is controlled in such a way that the recycling of granules with undesired size profile that are generated in the process is to remain at an output that is about 0.5 to about 2.5 times of the final product output, depending on the formulation. This procedure allows for the controlled growth of the granules, favoring granulation by deposition of layers. It also avoids the formation of a significant fraction of the granular material above about 5 mesh, which is not desirable for the process.

Moreover, the application of water comprising dissolved solids provides greater hardness and smoothness to the finished product of the present invention, on account of the closing of pores in the surface of the granules. This phenomenon occurs by the use of water comprising soluble solids generated by the dust recovery and return system during the granulation process, followed by the subsequent evaporation of the water in the drying stage, as discussed herein.

As shown in FIG. 1, the granules that leave granulator plate 108 are transferred, for example, by a pipe to inside rotary drier 110, where the thermal exchange of the granules with the hot air mass originating from furnace 109 occurs. Thermal energy comes from the reaction of a combustible material with oxygen of the air.

In some embodiments, the first quarter of rotary drier 110 is smooth, thereby allowing for the completion and finishing (conclusion) of the granulation process. In some embodiments, the other three quarters of the rotary dryer contain lifting flights, which are responsible for thorough drying of the granules. Thus, once the formation of the granules has been completed in the initial part of the rotary dryer, the middle and final parts of the rotary dryer are responsible for thorough drying of the finished fertilizer granules. The rotation of the dryer is typically maintained between about 4 rpm and about 8 rpm, depending on the formulation. As will be appreciated by one of skill in the art, other suitable drying methods may be used in the process of the invention.

The temperature of the granular material in the dryer output, before proceeding to sieving stage, varies between about 65° C. and about 90° C. What is important is that the granular fertilizer attains, after the drying stage, hardness equal to or over about 1.5 kg/granule and moisture equal to or less than about 5% w/w.

As shown in FIG. 1, from rotary dryer 110, the granular material proceeds to vibrating sieve 112 by means of bucket elevator 111. The sieve has a double deck, with selection through about 9 mesh opening and about 5 mesh opening, thereby promoting size uniformity of the finished product of the present invention.

The fraction of the granular material passing through the about 9 mesh proceeds directly to conveyor belt 116, while the fraction retained in the about 5 mesh passes to mill 113. This procedure eliminates irregular granules in the finished product of the present invention. This mill is an impact micronizer that reduces the granules that are above 5 mesh in size to a size profile where 100% passes through 18 mesh opening. Shown in FIG. 1, the fraction of granules less than 9 mesh and the fraction crushed by mill 113 are transported by belt 116 to granulator plate 108.

The return of the hot recycled granular material from the vibrating sieve 112 to the granulator plate helps to maintain the temperature of the granulation bed (and preferably the material being granulated) between about 40° C. and about 75° C., depending on the formulation, which positively impacts the physical appearance of the granules, and also reducing the consumption of energy in the process.

Shown in FIG. 1, the fertilizer granules passing through 5 mesh and retained in the 9 mesh is directed to cooler 114 and, from there, to silo 115 in the storage area.

Figure 6:
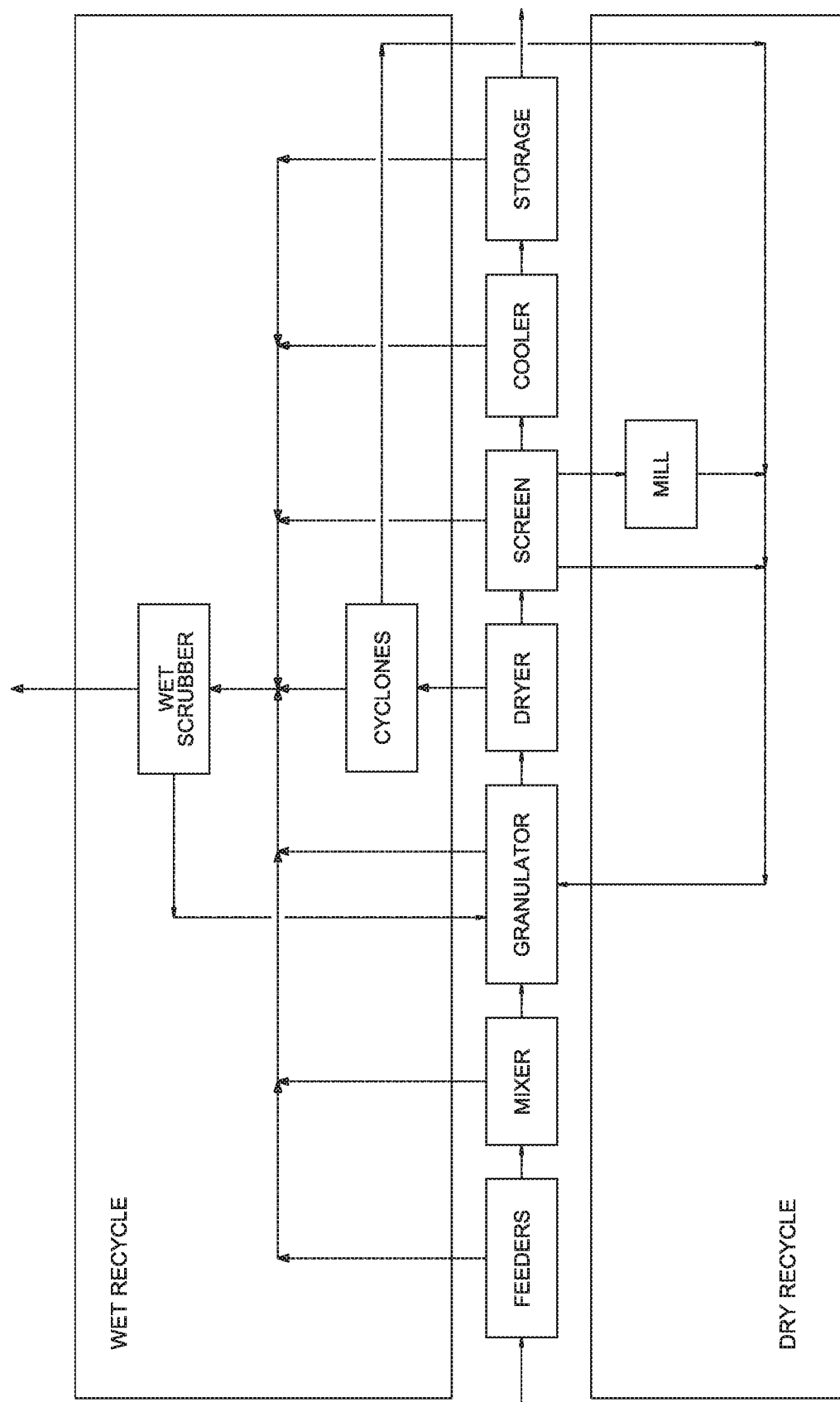
FIG. 6 is a schematic diagram showing flow of material into the process and through the return and recycle system.

Shown in FIG. 1, the hot and humid air, containing dust generated by the drying process, leaves rotary drier 110, and passes to the cyclone system 117, where at least about 80% of the particulate matter is recovered as powder, thus in a solid form. The cyclone system 117 comprises one or more cyclones depending on the type, amount and/or size profile of the particulate matter. The material retained in the cyclone system 117, together with fines from the vibrating green 112 and the oversize from the mill 113, comprises the dry recycle, as shown in FIG. 6.

In some embodiments, after passing through the cyclone system 117, the air exhausted from the dryer moves to the gas washing system 118, in which the remaining about 20% of particulate matter is captured.

In other embodiments, air from other points of the process, such as the hoppers 101 and 103, mixer 105, granulator 108, bucket elevator 111, vibrating screen 112, mill 113, cooler 114, silo 115, and possibly from material transfer points, such as from belt conveyor 116 to granulator 108, are moved through the gas washing system 118 as these all represent points that may be a source of particulate matter to be recovered, as shown in FIG. 1.

Besides the particle matter, the washing system is also responsible for retaining the gases generated in the process, such as but by no means limited to NOx, SOx, $NH_3$ and/or HF. These gases may come from the reaction of raw materials and/or ingredients inside the mixer 105, or from the reaction of a combustible fuel source and the oxygen of atmospheric air inside the furnace 109.

As will be appreciated by one of skill in the art, the specific components of the gas washing system will depend on the type, amount and/or size profile of the particulate matter and/or gases to be recovered and/or retained. In one embodiment, the washing system comprises a venture scrubber followed by a demister. The scrubber captures the particulate matter and gases from the air using clean water, whereas the demister retains the water used in the previous step, before the air is released to the atmosphere. Advantageously an efficiency of at least about 90% for particulate matter removal is achieved. The water is collected in a tank and transferred to the water treatment system 119.

Similarly, the specific components of the water treatment system will vary depending on the characteristics of the particulate matter and gases to be recovered and/or retained. In one embodiment, the treatment system comprises a clarifier, optionally associated with a pH controller and a dosing system for flocculant/coagulant. The function of the clarifier is to separate the suspended particulate matter from the water that will be used again in the plate granulator 108 and in the gas washing system 118. As discussed herein, this water may have dissolved solids, but must be free of suspended solids so as to not clog the spray nozzles of the granulator or the venture scrubber.

While the clean water is collected at the top of the clarifier, the insoluble fraction of the particulate matter is recovered from the bottom of the clarifier with a maximum solid content of about 40% w/w. This suspension or slurry comprises the wet recycle, as shown in FIG. 6, and may contain not only suspended solids but also dissolved solids and may be used in the hydration stage of the process. In some embodiments, this suspension may also be used in the granulator.

The result of the process of the present invention is a granular fertilizer of organic and/or inorganic nature, with a uniform size profile and good distribution of nutrients in each granule. Specifically, the final product must achieve sphericity higher than about 85%, hardness greater than about 1.5 kg/granule, and a moisture content less than about 5% w/w.

A granular fertilizer containing macronutrients and micronutrients as the finished product of the present invention will now be further elucidated by way of examples; however, the present invention is not necessarily limited to the examples.

EXAMPLE I

Granular Fertilizer Composition Comprising Magnesium, Elemental Sulfur, and Clay The following example describes the production of a concentrated granular magnesium fertilizer. As discussed herein, the granule has desirable hardness and disintegrates in water.

In some embodiments, the granular magnesium fertilizer comprises a mixture of magnesium (about 15% w/w to about 30% w/w) and sulfur (about 20% w/w to about 40% w/w), with all percentages being by weight and based upon the total product weight taken as 100% by weight.

In other embodiments, the granular magnesium fertilizer comprises magnesium oxide (about 28% w/w to about 60% w/w), elemental sulfur (about 20% w/w to about 42% w/w), high swelling clay such as montmorillonite (about 6% w/w to about 18% w/w) and binders (about 2% w/w to about 7% w/w). As will be appreciated by one of skill in the art, any suitable binder, for example but by no means limited to, sugar, starch, modified starch, lignosulfonates, sugarcane molasses or combinations there, may be used.

In some embodiments, the use of an acid such as but by no means limited to sulfuric acid or phosphoric acid enhances the disintegration of the granules, working in synergy with montmorillonite-type clay. The amount of acid in the final product may not exceed 5% w/w.

In one embodiment, the components of the granular magnesium fertilizer comprise: magnesium oxide (MgO)

48.12% w/w, elemental sulfur 35.38% w/w, calcium lignosulfonate 2.00% w/w, molasses 2.50% w/w, and montmorillonite clay 12.00% w/w.

The nature of the raw materials or ingredients for the granulation process is important in order to generate highly spherical granules having high hardness and good disintegration in water, as discussed herein.

For example, the montmorillonite-type clay may have a swelling capacity in water such that 2 g of clay can absorb about 30 ml of water. As a result of this arrangement, the granule will disintegrate in contact with water. Natural or synthetic sodium bentonites are examples of clays that can be used for this purpose, although other suitable clays will be readily apparent to one of skill in the art.

Binders or granulation aids allow for efficient granulation, which reduces the amount of material that must be recycled within the process. Second, soluble binders provide greater water permeability within the granule, accelerating the swelling of the clay which in turn promotes disintegration of the granule.

Figure 2:
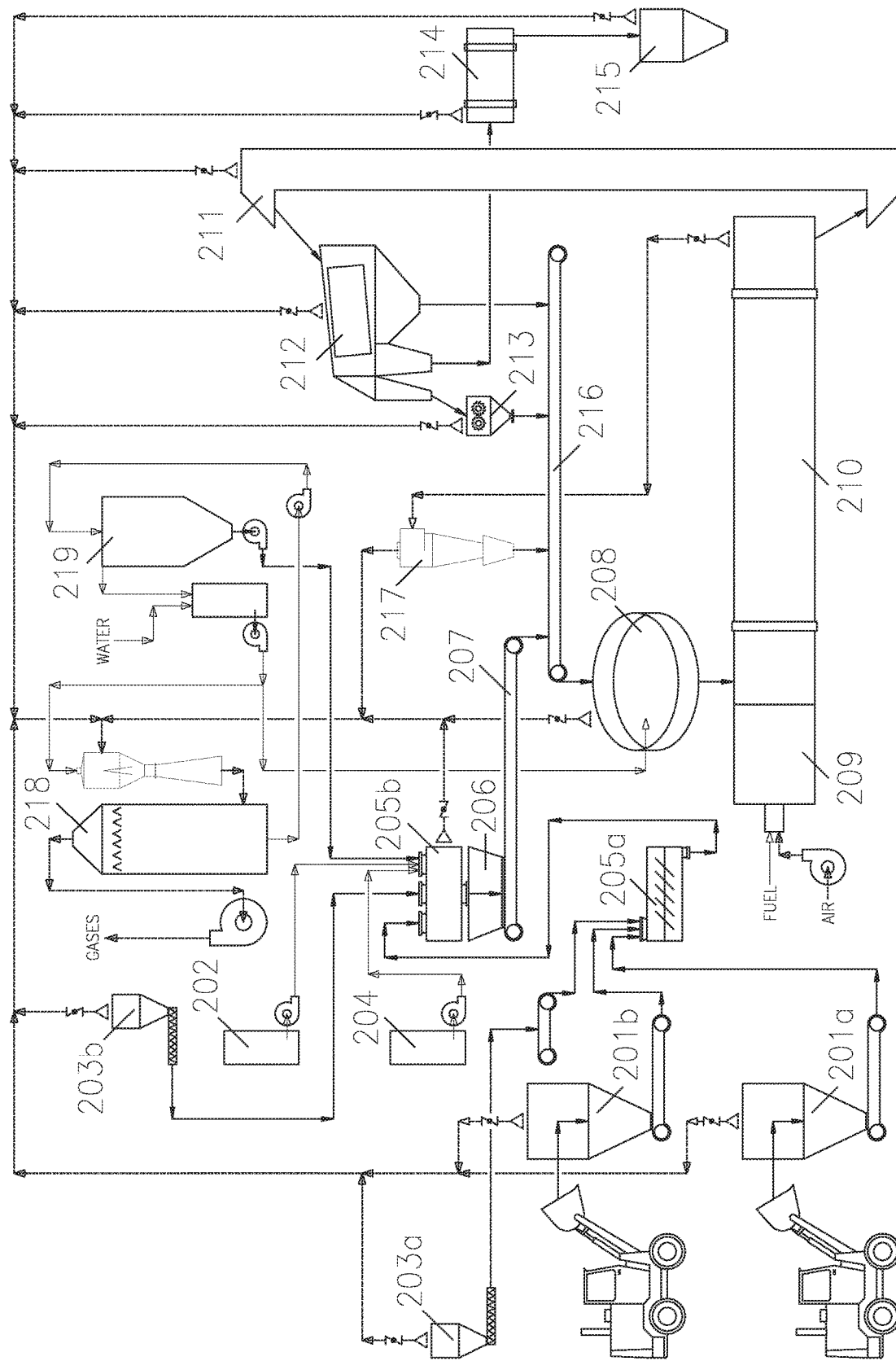
FIG. 2 is a flowchart of the process for obtaining the granulated magnesium, elemental sulfur and clay fertilizer composition.

As shown in FIG. 2, the production process starts with a premix in a continuous mixer 205a of magnesium oxide 201a, elemental sulfur 201b, and a solid binder 203a such as for example but by no means limited to starch, pregelatinized starch, molasses or mixtures thereof. As discussed herein, the raw material and/or ingredients can be fed individually or as a premix. As discussed herein, the components of the premix may be ground prior to addition to the mixer.

In a batch mixer 205b, which belongs to the granular fertilizer manufacturing process discussed herein, montmorillonite-type clay 203b, an aqueous solution of lignosulfonate 50% 204 and water containing dissolved and/or suspended solids 219 is added to the premix. Optionally, an acid such as sulfuric acid or phosphoric acid 202 may be added to the premix. Montmorillonite-type clay 203b is added at this step to guarantee the correct amount and homogenization of the mass inside the batch mixer 205b. Otherwise, the final product may be reproved by dispersion in water. On the other hand, the water containing dissolved and/or suspended solids 219 is added in sufficient quantity to bring the mass to a moisture content between about 4% w/w and about 6% w/w, taking into account the amount of water in the lignosulfonate solution. The batch mixer 205b promotes the formation of an intensive mixture of all components for at least 2 minutes, thereby ensuring a relative variation coefficient equal to or less than about 5% for the nutrients in the final product. After this, the blend is discharged in a holding silo 206 and sent to a granulator plate 208 via conveyor belts 207 and 216.

During granulation, water is added by means of spray nozzles which allow the continuous feeding and homogeneous distribution of the water. The amount of water may be enough to bring the moisture content of the granules to between about 5% w/w and about 9% w/w, taking into account the mixture of material coming from the holding silo 206 and the dry recycle coming from a vibrating screen 212, a mill 213, and a cyclone system 217. The use of water, together with the cleaning of the surface of the granulator plate 208 and the control of the speed of rotation and inclination of the granulation equipment, discussed above, promotes production of a spherical granular fertilizer product. The water sprayed in the granulator plate 208 comes from the water treatment system 219, already free of insoluble solids.

Following granulation, the material is transported to a dryer 210. The dryer 210 may be a rotary drum, and the drying temperature, at the entrance of the dryer, should be kept below the ignition temperature of sulfur, thus around 200° C.

After drying, the material passes to a sorting sieve 212. As discussed above, the material retained by a about 6 mesh is transported to the reduction mill 213. There, the oversized granules are broken down and returned to the granulator plate 208 via conveyor belt 216. The material passing through the about 8 mesh passes directly to the granulator plate 208 without passing through the mill. The granules of the desired size are directed to a cooler 214 and from there to storage area 215.

The dry recycle ratio is suggested to be kept between about 0.3 and about 0.5, which means taking the average of the suggested range about 0.4 kg/h of recycle for each 1 kg/h of final product.

The finished product has high hardness, for example, hardness greater than about 1.5 kg/granule, moisture content between about 0.3% w/w to about 1.0% w/w and disperses in water in less than about 20 minutes. Actually, moisture contents lower than 0.3% may cause low dispersion in water, whereas moistures contents greater than 1.0% may affect granule's hardness.

As will be known by those of skill in the art, there are several methods for determining hardness, for example by determining the crushing strength of the granules or the impact resistance of the granules. For example, in some embodiments, a suitable method for determining the hardness of a fertilizer granule prepared according to the invention is the use of a device similar to a Tablet Hardness Tester. It is of note that such devices are well-known in the pharmaceutical arts and a wide variety of such devices are known in the art. As discussed herein, the finished fertilizer granules of the invention preferably have a hardness of at least about 1.5 kg/granule. Typically, the article to be tested is placed on a stage, with movement of the article being restricted at a first end thereof. The second end of the article is then subjected to an impacting force by a moving piston. The force of the piston is measured during this process and the process is stopped when either the article cracks or a particular force has been reached. That is, either when the maximum hardness of the article has been determined or once the article has been determined to have a specific minimum hardness.

As discussed herein, all particulate matter from the stages of feeding, mixing, granulation, drying, cooling, screening, grinding and transfer points is collected in the gas washing system 218, concentrated in the water treatment system 219, and pumped to the batch mixer 205b as a slurry. This slurry comprises the wet recycle and may contain till 30% w/w of solids. Only the powder coming from drying stage passes throw the cyclone system 217 before reaching the gas washing system 218. This powder comprises the dry recycle, together with the oversize and downsize granules from the vibrating screen and returns to granulator plate 208 via conveyor belt 216.

For safety reasons, the exhaust points of the main equipment must be sized to ensure a sulfur concentration of less than about 30 mg/m$^3$ of atmospheric air. This preventive measure, as well as the temperature control in the drying stage, aims to eliminate the risk of ignition of the sulfur powder and consequent explosion. In any case, it is advisable to install explosion protection and fire-fighting systems in some of the most critical equipment such as dryer, bucket elevator, mill, cyclone system and vibrating screen.

The new product has a high concentration of magnesium (about 15% w/w to about 30% w/w) and sulfur (about 20% w/w to about 40% w/w) and supplies magnesium slowly and gradually.

The addition of high swelling clay enables rapid disintegration of the granule, allowing the soil bacteria to oxidize elemental sulfur to sulfate, which reacts with the magnesium oxide to form magnesium sulfate. It also allows that, after granule disintegration, the finely divided magnesium oxide is available for action of the organic acids produced by the roots of the plants, providing magnesium ions to the plant.

EXAMPLE II

Granular Micronutrient and Aluminosilicate Fertilizer

This example describes the formula for a granular fertilizer comprising a high concentration of zinc, manganese, copper, and boron. The formula also includes aluminosilicate, which promotes nutrient retention in the soil, and granulating additives, which promote the formation of a highly spherical granular fertilizer having high hardness.

In some embodiments, the formula comprises zinc (about 7% w/w to about 11% w/w) manganese (about 7% w/w to about 11% w/w) copper (about 2% w/w to about 4% w/w) boron (about 2% w/w to about 4% w/w), hydrated aluminosilicate (about 15% w/w to about 25% w/w), low water swelling clay (about 2% w/w to about 5% w/w) and a binding agent (about 2% w/w to about 5% w/w). The foregoing percentages are those of the element being targeted for delivery.

In some embodiments, the zinc is in the form of zinc sulfate monohydrate (about 15% w/w to about 30% w/w), the manganese is in the form of manganese sulphate monohydrate (about 20% w/w to about 35% w/w), the copper is in the form of copper sulphate monohydrate (about 5% w/w to about 12%), the boron is in the form of sodium octaborate (about 10% w/w to about 20% w/w), the hydrated aluminosilicate is a clinoptilolite (about 15% w/w to about 25% w/w), and the low water swelling clay is montmorillonite type clay (about 2% w/w to about 5% w/w). The foregoing percentages are those of the full ingredient or compound being added (e.g., zinc sulfate monohydrate), as opposed to simply the element being targeted for delivery (e.g., zinc). The binding agent may be for example but by no means limited to a sugar, a starch, a modified starch, a lignosulfonate, molasses, or combinations thereof.

The hydrated aluminosilicate type clinoptilolite supplies an ion exchange function to the mixture, as discussed herein. The hydrated aluminosilicate type clinoptilolite is also known as natural zeolite and has a three-dimensional crystalline structure. The inner channels of zeolite, by virtue of their uniform molecular structure, are occupied by interchangeable cations and water, offering high absorption and adsorption capacity. The most common and most commercially available natural zeolite today is clinoptilolite. This material also imparts hardness to the finished product, a desirable feature for obtaining high mechanical strength granules.

The low water-swelling clay should be with a clay that absorbs less than about 7 ml of water per 2 g of clay, for example, a low water swelling montmorillonite-type clay. Natural calcium bentonites are clays that can be used for this invention. The clay promotes binding during the formation of the granule and imparts sphericity and hardness to the granule formed.

The raw material or ingredients for the granulation process must be such that about 100% passes through 18 mesh opening; at least about 70% passes through 60 mesh opening; and at least about 40% passes through 100 mesh opening. As discussed herein, as a result of this arrangement, highly spherical fertilizer granules having high hardness are generated.

Figure 3:
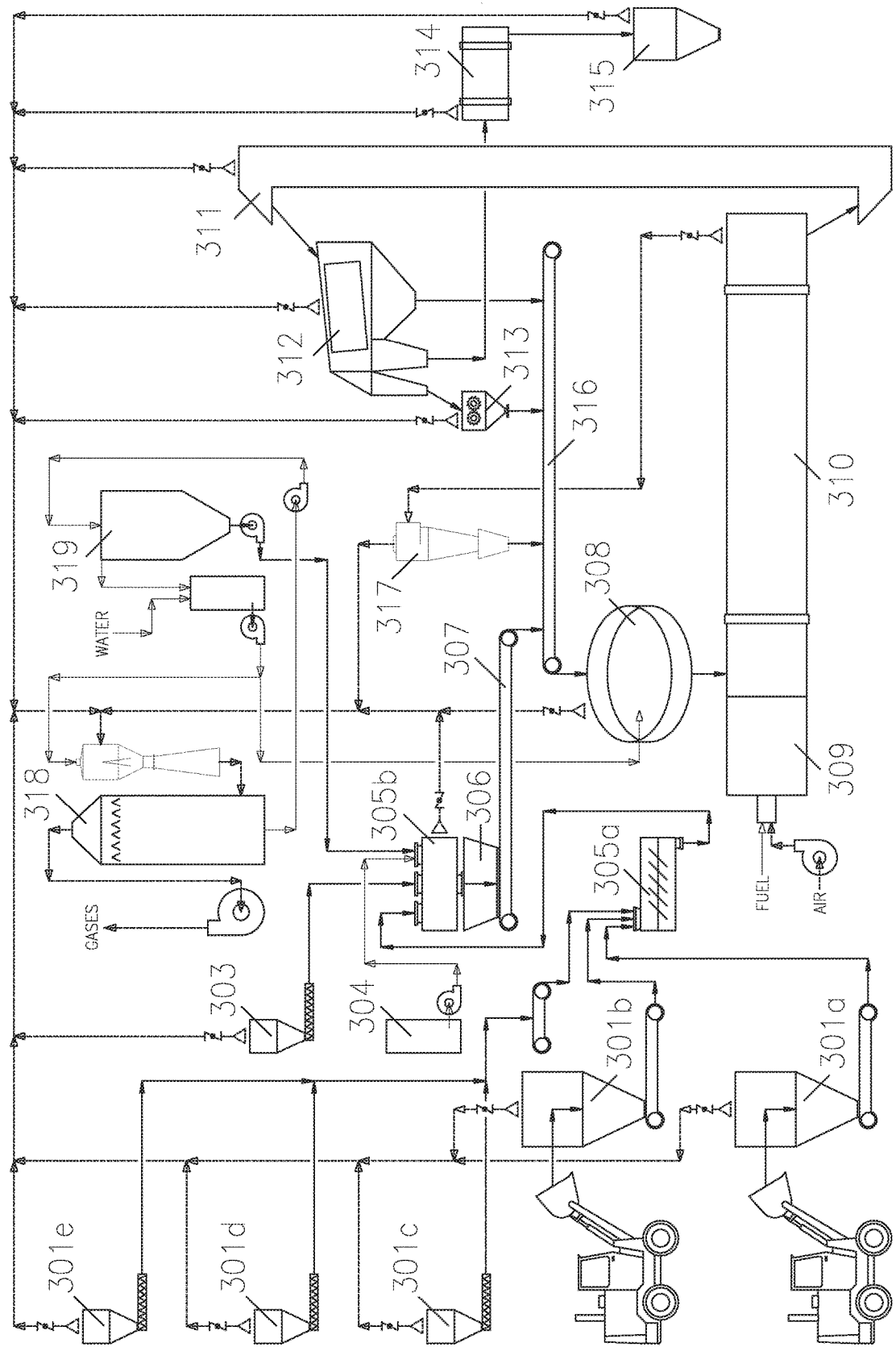
FIG. 3 is a flowchart of the process for obtaining the soluble micronutrient and aluminosilicate fertilizer composition.

As shown in FIG. 3, the production process involves prior mixing in a continuous mixer 305a in which zinc sulfate monohydrate, manganese sulphate monohydrate, copper monohydrate sulphate, sodium octaborate and the hydrated aluminosilicate are added independently from separate hoppers. The sources of zinc and manganese are dosed by conveyor belts 301a and 301b, and the sources of copper, boron and aluminosilicate are dosed by screw feeders 301c, 301d and 301e, respectively. As discussed herein, the raw material and/or ingredients can be fed individually or as a premix. As discussed herein, the components of the premix may be ground prior to addition to the mixer.

The product from the continuous mixer 305a is fed to a batch mixer 305b, which belongs to the granular fertilizer manufacturing process discussed herein and where some ingredients like calcium montmorillonite-type clay and calcium lignosulfonate are added, using the screw feeder 303 and a dosing pump 304 respectively. Slurry from a water treatment system 319 is added such that the mixture reaches a moisture content of from about 5.5% to about 7.5%. At this stage of the process, water acts to hydrate the mixture, which previously was composed of monohydrate salts.

After incorporation of the additives and the water into the mixture, which may take at least 2 minutes in the batch mixer, the material is discharged in the holding silo 306 and sent to a granulator plate 308 through conveyor belts 307 and 316. During the granulation process, water is added through spray nozzles that allow continuous and homogeneous distribution of the water. The amount of water sprayed is sufficient enough to bring moisture content of the freshly bred granules to about 6% to about 10%. This water is free of insoluble solids and also comes from the water treatment system 319.

After granulation, the moist granules proceed to a rotary dryer. In the dryer 310, the heat exchange of the granular material with the mass of hot air from a furnace 309 is carried out. The thermal energy may be produced for example by the combustion of natural gas or another fuel source with oxygen of the air, promoted with the aid of a burner. In some embodiments, the first quarter of the rotary dryer is smooth, allowing for the completion of the granulation process, as discussed herein. The other three quarters promote more thorough drying of the finished fertilizer granules, as discussed herein.

After drying, the material passes through a vibrating screen 312. As discussed herein, the material retained by a 6 mesh is conveyed to a reduction mill 313 and, after being ground, is returned to the granulator plate 308. The material passing through the 8 mesh is returned directly to the granulator plate 308 via conveyor belt 316. The material passing through the 6 mesh and retained by the 8 mesh is conducted by a chute to the cooler 314 and then to the finished product storage area 315. After the drying step, in some embodiments, the granular fertilizer has a hardness of at least about 1.5 kg/granule and a moisture content of about 0.5% to about 1.5%.

Nearly all particulate material generated in the drying step is collected through cyclone system 317. This material is conveyed back to the granulator plate 308, via conveyor belt 316, along with the milled oversize and the fines of the process. All together comprise the dry recycle, which may be controlled at the range of about 70% to about 90% of final product flow rate.

On the other hand, the remaining particulate matter is collected in the gas washing system 318. This material comprises the wet recycle and is concentrated in the water treatment system 319 and pump back to the batch mixer 305b as a slurry, with no more than about 15% of insoluble solids.

The finished product is a high concentration of zinc (about 7% w/w to about 11%), manganese (about 7% w/w to about 11%), copper (about 2% w/w to about 4%) and boron (about 2% w/w to about 4%) in the same granule and provides these nutrients to plants slowly and gradually. This special characteristic of the product is promoted by the addition of hydrated aluminosilicate type clinoptilolite (about 15% w/w to about 25% w/w) in the formulation, which promotes ion exchange, retaining in its structure the nutrients in the form of ions, avoiding leaching and allowing the most efficient assimilation of nutrients by the plant.

This formulation uses nutrients whose sources are highly soluble. Specifically, zinc, manganese and copper are in the form of sulphates, and the boron is in the form of sodium octaborate. However, as discussed herein, the clinoptilolite acts as a nutrient retention agent.

Furthermore, the fertilizer as the finished product is granular and is highly spherical, which allows for good homogeneity with other granular fertilizers, with much reduced segregation effects.

EXAMPLE III

Potassium Chloride Based Granular Fertilizer

The example describes a granular fertilizer composed of potassium chloride. In some embodiments, the formula may include micronutrients.

The potassium is water soluble with a minimum concentration of about 53% $K_2O$ w/w or about 44% K w/w when the fertilizer granule comprises only potassium chloride as nutrient and a minimum concentration of about 22% $K_2O$ or about 18% K w/w as potassium chloride when the mixture comprises one or more micronutrients such as for example but by no means limited to boron, copper, manganese and zinc, wherein each micronutrient is present at a minimum concentration of about 0.5% of the granular fertilizer by weight/weight.

The potassium chloride used in the granulation process of this example has a minimum content of about 58% $K_2O$ w/w or about 48% K w/w in the form of potassium chloride, with moisture and properly controlled contaminants.

Regarding the amounts of micronutrients provided below, the percentage recited is the minimum percentage of the element being targeted for delivery (e.g., boron) from the full compound, with the full compound being added at least about 0.5% of the granular fertilizer by weight/weight, as discussed above.

The sources of boron which may be used in the granulation process include disodium octaborate with a minimum content of about 20% B w/w, sodium pentaborate with a minimum content of about 18% B w/w, sodium tetraborate (borax) with a minimum content of about 11% B w/w and mixtures thereof.

The sources of copper that may be used include but are by no means limited to copper chloride with a minimum content of about 30% Cu w/w, copper nitrate with a minimum content of about 22% Cu w/w, copper sulphate with a minimum content of about 24% Cu w/w and mixtures thereof.

The sources of manganese may be but are by no means limited to manganese chloride with a minimum content of about 25% Mn w/w, manganese nitrate with a minimum content of about 16% Mn w/w, manganese sulfate with a minimum content of about 20% Mn w/w, and mixtures thereof.

The sources of zinc may be, but are by no means limited to, zinc chloride with a minimum content of about 30% Zn w/w, zinc nitrate with a minimum content of about 18% Zn w/w, zinc sulfate with a minimum content of about 20% Zn w/w, and mixtures thereof.

As discussed herein, the raw materials or ingredients must be previously ground. In some embodiments, after grinding, about 100% passes through 18 mesh opening; at least about 70% passes through 60 mesh opening; and at least about 40% passes through 100 mesh opening.

Figure 4:
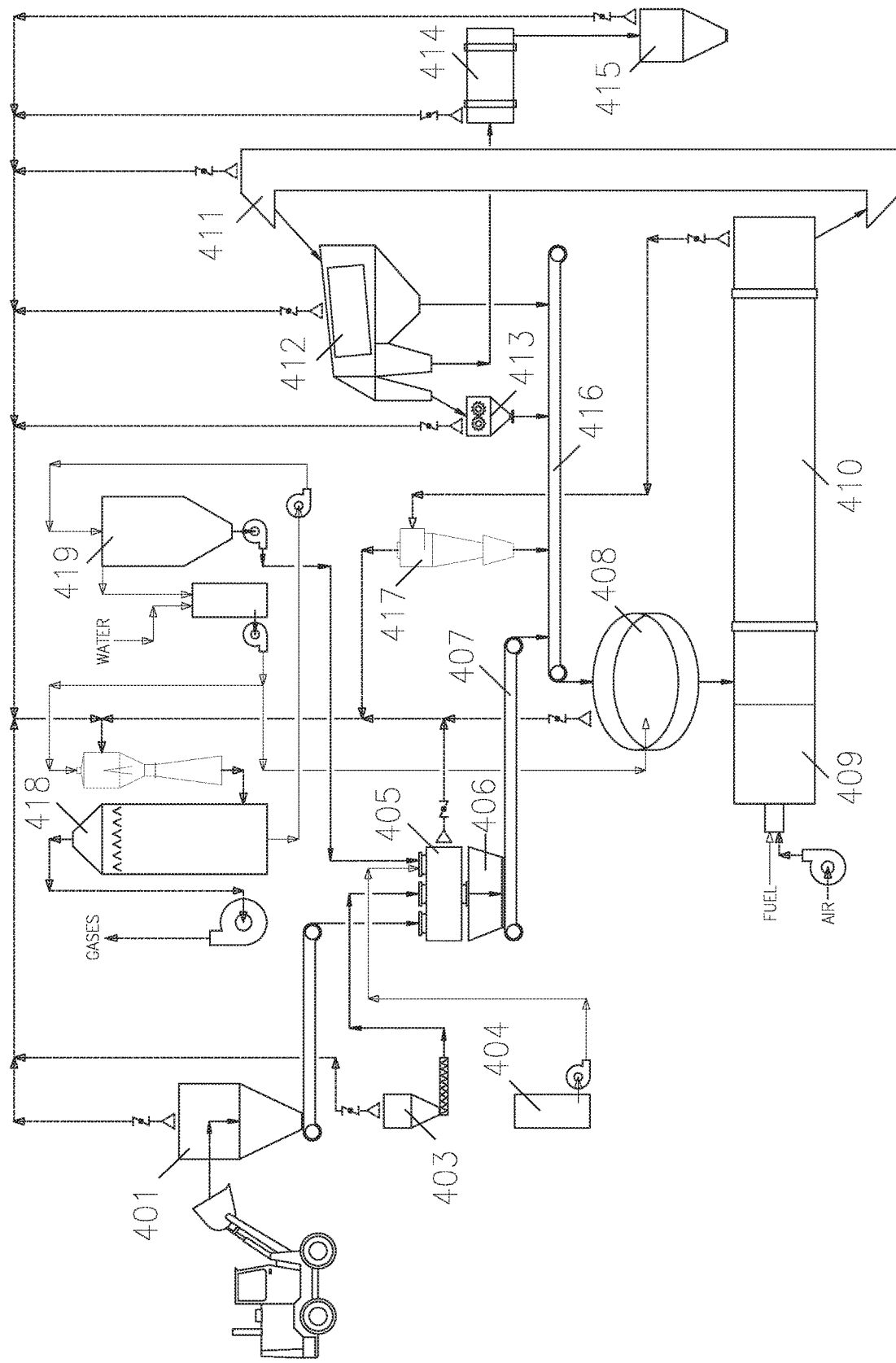
FIG. 4 is a flowchart of the process for obtaining the potassium chloride-based fertilizer.

As shown in FIG. 4, the ground potassium chloride or the premixture of micronutrients and ground potassium chloride is fed into the hopper 401. The extraction belt withdraws the material from the hopper 401 and transfers the material to the batch mixer 405. In the mixer, other ingredients are added, which in some embodiments do not exceed about 5% w/w of the final composition.

Metering screw 403 feeds bentonite, while dosing pump 404 feeds about 50% w/w aqueous calcium lignosulfonate solution. The choice of bentonite and calcium lignosulfonate is based on the agglomeration capacity of these binders. If the granular product is to be used in a line of controlled release fertilizers, low swelling bentonite capable of absorbing less than about 7 ml of water per 2 g of clay is preferred. Slurry from water treatment system 419 may be incorporated into the mixture recovering the solids retained in the gas washing system 418 and bringing the moisture to the ideal content of about 4% to about 6% before granulation stage.

After at least 2 minutes of homogenization, the mixture is transferred to the granulator plate 408 by means of the conveyor belts 407 and 416. The holding silo 406 does the transition of the process from batch to continuous system. Inside the granulator plate, spray nozzles ensure the continuous and well-distributed delivery of water on the material. Scrapers keep the bottom and the inner side surface clean. As discussed herein, both contribute to the production of a finished product of highly spherical fertilizer granules with high hardness. The humidity of the material at this point should be between about 6% and about 10%.

The granular material leaving the granulator plate 408 is transferred into the rotary dryer 410 by means of a chute. In the dryer 410, the heat exchange of the granular material is carried out with the mass of hot air from the furnace 409. Thermal energy may be provided by the combustion of natural gas or another fuel with oxygen from the air with the aid of a burner. The first quarter of the rotary dryer 410 is smooth, allowing the completion of the granulation process by subjecting the fertilizer granules to heat without significant agitation, as discussed herein. In this embodiment, the other three quarters of the rotary dryer are supplied with lifting flights and contribute substantially to the drying of the product. That is, once the granule formation has been completed in the initial part of the rotary dryer, the middle and final parts subject the formed fertilizer granules to a thorough drying. It is of note that other suitable arrangements for drying will be apparent to one of skill in the art and can be used within the process of the invention.

From the rotary dryer 410, the material moves to the vibrating screen 412 by means of the bucket elevator 411. The material retained in the 6 mesh is conveyed by a chute to the reduction mill 413. After being ground by the mill 413, this rejected material is transported by the conveyor belt 416 to the granulator plate 408.

The material passing through the 8 mesh flows directly to the conveyor 416. The return of heated recycled material helps maintain the temperature of the granulation bed (and preferably of the material being granulated) over 40° C., as discussed herein.

The portion of the material passing through the 6 mesh and retained by the 8 mesh is sent to the cooler 414 and then to the storage silo 415.

The dry recycle ratio is suggested to be kept between about 1.9 and about 2.1, which means taking the average of the suggested range about 2 kg/h of dry recycle for each 1 kg/h of final product. The dry recycle is comprised by the material coming from the screen 412, the mill 413 and cyclone system 417.

The gas washing system 418 captures the powder from the whole plant and generates a suspension comprising potassium chloride or potassium chloride with micronutrients. There is an insoluble fraction, which comprises bentonite and impurities from the raw material and ingredients, that is concentrated as a slurry in the water treatment system and sent back to the mixer 405. This slurry comprises the wet recycle and may contain till 8% w/w of insoluble solids.

The finished product shows hardness greater than about 1.5 kg/granule, and moisture content lower than about 1.0% w/w.

This product may be coated by a barrier to avoid or reduce the physical and chemical interactions that may occur between nutrients and the soil.

With the coating, a fertilizer containing at least about 42% $K_2O$ w/w or about 35% K w/w as potassium chloride is obtained in the case of potassium only as a nutrient and with a concentration of about 18% $K_2O$ w/w or 15% K w/w in the form of potassium chloride when the fertilizer also contains at least one micronutrient such as boron, copper, manganese or zinc (with a minimum concentration of about 0.30% of the micronutrient by weight I weight of the granule).

EXAMPLE IV

Coating Process

This example also describes coating the fertilizer granule with a barrier which will allow for the controlled release of nutrients into the soil and reduce nutrient losses due to leaching or soil adsorption. This barrier is formed by two layers, one composed of elemental sulfur that is applied on the granules as molten sulfur; the second layer, placed onto the sulfur layer, is a mixture of polymers. As will be appreciated by one of skill in the art, the thickness of each layer will determine the time release of the nutrient contained in the fertilizer to the soil.

The coating of granular fertilizer aims to increase the performance of the product in terms of nutrient supply, so that this coating will serve as a physical barrier that will regulate or control the release or dissolution of nutrients into the soil. With this controlled release of the nutrient in the soil, regular and continuous amounts of nutrients can be supplied to the plant, avoiding possible effects of nutrient losses due to leaching or soil adsorption.

The coating of the granules is composed of two barriers: the first is an elemental sulfur barrier, which is also considered a nutrient, and the second is a layer of polymer. The amount of each barrier will confer greater or lesser release of the nutrients in the soil.

As discussed herein, in some embodiments, the elemental sulfur that will form the first coating layer may range from about 11% w/w to about 16% w/w of the formulation.

As discussed herein, in some embodiments, the polymeric material may vary from about 1.4% w/w to about 3.0% w/w of the final formulation.

In some embodiments, the polymeric material comprises a paraffin wax in a proportion ranging from about 60% to about 70% by weight and an ethylene-vinyl acetate copolymer in a proportion ranging from about 30% to about 40% by weight.

That is, variation in the amount of sulfur and polymer in the coating will generate products with longer or shorter release patterns than expected. For example, an increase in the concentration of the sulfur and the polymer will reduce the rate of release and thus increase the release time of the nutrient in use.

Alternatively, reducing the sulfur (about 11% w/w) content and increasing the polymer (about 3% w/w) produces a product with a very fast release of nutrients. However, during the production process, granules coated with a coating of this type (low sulfur) may show greater sensitivity to temperature variations, because higher sulfur content promotes resistance to temperature variation.

Alternatively, increasing the sulfur (about 16% w/w) content and reducing the polymer (about 1.4% w/w) will produce a product with slower nutrient release. On one hand, the lower polymer content will result in a greater sensitivity to physical damage from the manufacturing process, as well as during transport and during application, because the polymer reduces the number of cracks that occur in the sulfur layer, by absorbing the force of the impacts that the granules are subjected to, as discussed above. This is a concern because cracks or fissures can result in the immediate release of nutrients.

As will be appreciated by one of skill in the art, for example, the granular fertilizer comprising potassium optionally including micronutrients may be coated for developing a variety of similar nutritional content fertilizer granules with variable release profiles. As discussed herein, for coated granular fertilizer supplying only potassium, the minimum concentration thereof is at least about 42% $K_2O$ w/w or about 35% K w/w as potassium chloride is obtained in the case of potassium only as the nutrient and with a concentration of about 18% $K_2O$ w/w or about 15% K w/w in the form of potassium chloride when the fertilizer also contains at least one micronutrient such as boron, copper, manganese and zinc, with a minimum concentration of about 0.30% of the micronutrient by weight/weight.

Figure 5:
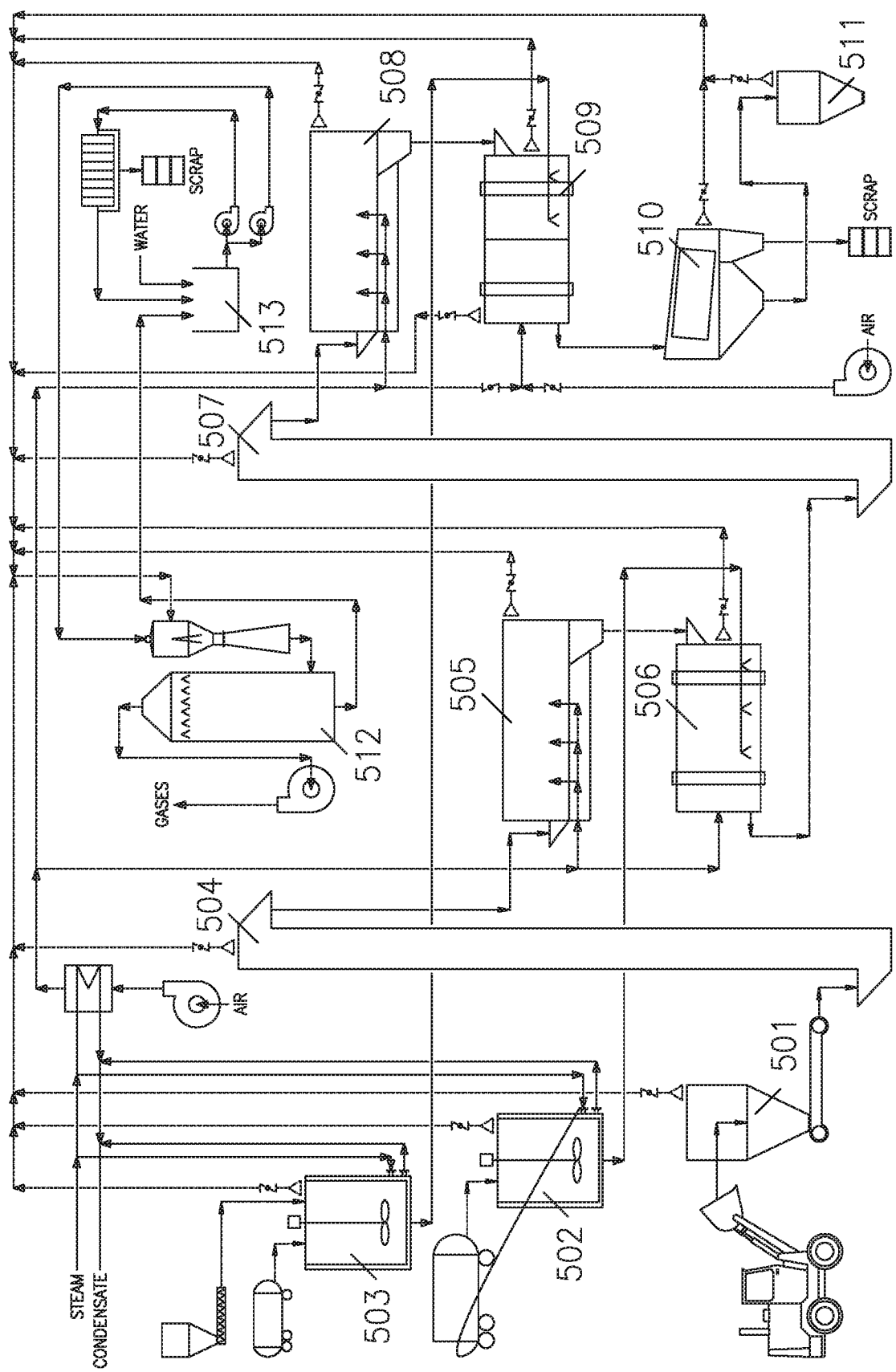
FIG. 5 is a flow chart for the coating of granular fertilizer.

The process of coating the fertilizer, shown in FIG. 5, is done in a separate process from the production of granular fertilizer.

The coating process starts with filling the hopper 520 with the granular fertilizer to be coated, which may be any of the granular fertilizers described herein or any other suitable granular fertilizer and/or fertilizer granules known in the art. The belt extractor under the hopper 520, discharges the granules into the bucket elevator 523, which raises the granules up to the fluidized bed dryer 524.

The purpose of the fluidized bed dryer is to eliminate any moisture or dust from the surface of the granules that may have been generated during the storage and/or transportation of the granules. This step improves the adherence of sulfur as the first layer to the granules. The temperature in the dryer is regulated so as to be at about 120° C.

From the fluidized bed dryer 524, the granules are transferred to the rotating drum 525 while being maintained at about 120° C. Inside the drum, atomized molten elemental sulfur from tank 521, heated to about 130° C., is sprayed onto the surface of the granules. The temperature difference between the molten sulfur and the granules promotes adhesion of the sulfur to the granules, thereby building the first layer of the coating. As discussed herein, in some embodiments, the amount of elemental sulfur ranges from about 11% w/w to about 16% w/w of the granule or of the coated granule.

Following the application of sulfur, the granules are conveyed by the bucket elevator 526 to the fluidized bed dryer 527, which removes any dust generated during the sulfur coating step from the surface of the granules. The temperature in the dryer is regulated at about 120° C.

The sulfur-coated granular fertilizer is then transferred to the rotary drum 528 for the application of the polymeric mixture. In some embodiments of the invention, this mixture comprises about 60% w/w to about 70% w/w of paraffin wax and about 30% w/w to about 40% w/w of ethylene-vinyl acetate (EVA) copolymer, although other suitable polymeric mixtures may be applied.

The rotary drum 528 processes the coated granules at two different temperatures. For the first part of the drum, the temperature is kept at about 120° C. During this part, the polymeric mixture, also at a temperature of about 120° C., is pumped from tank 522 and sprayed onto the surface of the sulfur-coated granules. After the coating step, the granules move to the second half of the rotary drum, which is kept at a temperature of about 80° C. This second part of the drum is used for the hardening and drying the coating. As discussed herein, in some embodiments, the amount of polymeric material ranges about 1.4% w/w to about 3.0% w/w of the final formulation.

Once the second layer of the coating has been applied and dried, the granules are sent to the vibrating screen 529, which removes any granules that may have stuck to each other, thereby forming undesirable agglomerates and thereby ensuring that the coated fertilizer granules have the desired size profile.

Coating the fertilizer with a barrier will allow the controlled release of nutrients into the soil. This barrier is formed by two layers, one composed of elemental sulfur that is applied on the granules in the molten form and another on top of the sulfur layer comprising a mixture of polymers. As discussed herein, the thickness of each layer will determine the time release of the nutrients contained in the fertilizer to the soil.

For example, the elemental sulfur which will form the first coating layer may range from about 11% w/w to about 16% w/w in the formulation. The polymeric material may vary from about 1.4% w/w to about 3.0% w/w in the final formulation. The polymeric material may be composed of a paraffin wax in a proportion ranging from about 60% to about 70% by weight and an ethylene-vinyl acetate copolymer in a proportion ranging from about 30% to about 40% by weight.

The scope of the claims should not be limited by the preferred embodiments set forth in the examples but should be given the broadest interpretation consistent with the description as a whole.

We claim:

1. A fertilizer granule comprising:
   about 28% to about 60% (w/w) magnesium oxide;
   about 20% to about 42% (w/w) elemental sulfur; and
   about 6% to about 18% (w/w) clay.

2. The fertilizer granule of claim 1, wherein said clay has a swelling capacity in water such that 2 g of clay can absorb about 30 ml of water.

3. The fertilizer granule of claim 1, wherein said granule has a hardness of at least 1.5 kgf and a sphericity of at least 85%.

4. The fertilizer granule of claim 1, wherein said granule comprises:
   about 35% to about 50% (w/w) magnesium oxide; and
   about 25% to about 35% (w/w) elemental sulfur.

5. The fertilizer granule of claim 1, wherein said magnesium oxide and said elemental sulfur are provided in quantities that provide 1.3 g of sulfur per gram of magnesium.

6. A preparation comprising a plurality of fertilizer granules according to claim 1.

7. A fertilizer granule comprising:
   about 30% to about 50% (w/w) magnesium oxide;
   about 30% to about 50% (w/w) elemental sulfur; and
   about 8% to about 14% (w/w) clay.

8. The fertilizer granule of claim 7, wherein said clay has a swelling capacity in water such that 2 g of clay can absorb about 30 ml of water.

9. The fertilizer granule of claim 7, wherein said granule has a hardness of at least 1.5 kgf and a sphericity of at least 85%.

10. The fertilizer granule of claim 7, wherein said granule comprises:
    about 35% to about 50% (w/w) magnesium oxide; and
    about 25% to about 35% (w/w) elemental sulfur.

11. The fertilizer granule of claim 7, wherein said magnesium oxide and said elemental sulfur are provided in quantities that provide 1.3 g of sulfur per gram of magnesium.

12. A preparation comprising a plurality of fertilizer granules according to claim 7.

13. A fertilizer granule consisting essentially of magnesium oxide, elemental sulfur, clay, and a binder.

14. The fertilizer granule of claim 13, said granule further comprising an acid.

15. The fertilizer granule of claim 13, wherein said magnesium oxide and said elemental sulfur are provided in quantities that provide 1.3 g of sulfur per gram of magnesium.

16. The fertilizer granule of claim 13, wherein said clay has a swelling capacity in water such that 2 g of clay can absorb about 30 ml of water.

17. A preparation comprising a plurality of fertilizer granules according to claim 13.

* * * * *